United States Patent
Maduri

(10) Patent No.: US 12,001,447 B2
(45) Date of Patent: *Jun. 4, 2024

(54) TECHNIQUES FOR UNIFYING ETL FILTER OPERATORS

(71) Applicant: Oracle International Corporation, Redwood Shores, CA (US)

(72) Inventor: Hanumath Rao Maduri, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 61 days.

This patent is subject to a terminal disclaimer.

(21) Appl. No.: 18/081,194

(22) Filed: Dec. 14, 2022

(65) Prior Publication Data

US 2023/0111944 A1 Apr. 13, 2023

Related U.S. Application Data

(63) Continuation of application No. 17/080,158, filed on Oct. 26, 2020, now Pat. No. 11,556,557.

(51) Int. Cl.
*G06F 16/25* (2019.01)
*G06F 16/2453* (2019.01)
(Continued)

(52) U.S. Cl.
CPC ...... *G06F 16/254* (2019.01); *G06F 16/24542* (2019.01); *G06F 16/24554* (2019.01); *G06F 16/287* (2019.01)

(58) Field of Classification Search
CPC ............ G06F 16/254; G06F 16/24542; G06F 16/24554; G06F 16/287
See application file for complete search history.

(56) References Cited

U.S. PATENT DOCUMENTS 6,208,990 B1 3/2001 Suresh et al.
8,719,769 B2 5/2014 Castellanos et al.
(Continued)

OTHER PUBLICATIONS

"Features Supported in Centerprise Pushdown Optimization Mode", Astera, Available Online at: https://www.astera.com/wp content/uploads/2019/08/Doc2.pdf, Accessed from Internet on Sep. 7, 2020, 50 pages.
(Continued)

*Primary Examiner* — Cam Y T Truong
(74) *Attorney, Agent, or Firm* — Kilpatrick Townsend & Stockton LLP

(57) ABSTRACT

Techniques are provided for unifying filter operators in exchange, transform, load (ETL) plans. Such a technique includes a method that may include receiving, by a computer system, an ETL plan including a split operator and a plurality of filter operators. The may include identifying, by the computer system, that the plurality of filter operators are configured to act on data output by the split operator in the ETL plan. The method may include generating, by the computer system, a unified filter operator using the plurality of filter operators. The method may include generating, by the computer system, an updated ETL plan comprising the unified filter operator providing filtered data to the split operator. The method may also include storing the updated ETL plan in a data store.

19 Claims, 12 Drawing Sheets

(51) Int. Cl.
*G06F 16/2455* (2019.01)
*G06F 16/28* (2019.01)

(56) References Cited

U.S. PATENT DOCUMENTS

| | | |
|---|---|---|
| 8,744,994 B2 | 6/2014 | Chen et al. |
| 9,727,604 B2 | 8/2017 | Jin et al. |
| 2008/0147707 A1* | 6/2008 | Jin .................... G06F 16/24537 |
| | | 707/999.102 |
| 2013/0097604 A1* | 4/2013 | Simitsis ................ G06Q 10/06 |
| | | 718/100 |
| 2019/0079981 A1 | 3/2019 | Dhayapule et al. |

OTHER PUBLICATIONS

"Performance Tuning Guide", Informatica, Available Online at: https://docs.informatica.com/content/dam/source/GUID-8/GUID-8A19C373-08FD-4320-AC4C-2605A2913012/21/en/IN_102_PerformanceTuningGuide_en.pdf, Sep. 2017, 87 pages.
U.S. Appl. No. 17/080,158, "Notice of Allowance", mailed Oct. 3, 2022, 20 pages.
Ali et al., "From Conceptual Design to Performance Optimization of ETL Workflows: Current State of Research and Open Problems", The VLDB Journal, vol. 26, Available Online at: https://link.springer.com/article/10.1007/s00778-017-0477-2, 2017, pp. 777-801.

* cited by examiner

TECHNIQUES FOR UNIFYING ETL FILTER OPERATORS

CROSS-REFERENCES TO RELATED APPLICATIONS

The present application is a continuation of, and claims the benefit and priority to U.S. application Ser. No. 17/080,158, filed on Oct. 26, 2020, entitled "TECHNIQUES FOR UNIFYING ETL FILTER OPERATIONS," now allowed," the disclosure of which is incorporated by reference in their entirety for all purposes.

BACKGROUND OF THE INVENTION

Cloud-based platforms provide scalable and flexible computing resources for users. Such cloud-based platforms, also referred to as infrastructure as a service (IaaS) may offer entire suites of cloud solutions around a customer's data, such as solutions for authoring transformations, loading data, and presenting the data. Extract, transform, load (ETL) is the general procedure of copying data from one or more data sources into one or more destination systems that represent the data differently from the source(s) or in a different context than the source(s). An exemplary application of ETL operations is in data integration as part of IaaS data management. Data extraction involves extracting data from homogeneous or heterogeneous sources that may integrate data from multiple systems or applications, typically developed and supported by different vendors or hosted on separate computer hardware. Data transformation, by contrast, processes data by various operations effected on the data, such as data cleaning and transforming, to prepare the data for a storage format and/or structure for the destination system(s). Data loading describes the insertion of data into the destination system(s), which may include a database such as an operational data store.

In the data transformation stage, a series of transform operators may apply rules or functions to the extracted data to prepare it for loading into the destination system. The transform operators may include joining data from multiple sources (e.g., lookup, merge) and deduplicating the data. The transform operators may include splitting a column into multiple columns (e.g., converting a comma-separated list, specified as a string in one column, into individual values in different columns). The transform operators may also include filtering the data, for example, by selecting only certain columns to load, as when a data table is categorized by column attributes.

BRIEF SUMMARY

In general, techniques are provided for reducing computational and network resource usage associated with ETL procedures in an IaaS infrastructure network. In particular, techniques are directed, among other things, at reducing redundant filter operations in an ETL plan, thereby improving ETL efficiency and reducing resource demand during transformation of data according to the ETL plan.

In some embodiments, methods are provided for unifying filter operators in an ETL plan. In some embodiments a method includes receiving, by a computer system, an extract, transform, load (ETL) plan comprising a split operator and a plurality of filter operators. The method includes identifying, by the computer system, that the plurality of filter operators are configured to act on data output by the split operator in the ETL plan. The method includes generating, by the computer system, a unified filter operator using the plurality of filter operators. The method includes generating, by the computer system, an updated ETL plan comprising the unified filter operator providing filtered data to the split operator. The method also includes storing the updated ETL plan in a data store.

In a variation, the ETL plan further comprises a plurality of data pipelines following the split operator, the plurality of data pipelines having at least one filter operator of the plurality of filter operators on each data pipeline. The plurality of filter operators may be or include a plurality of primary filter operators, the split operator may be a primary split operator, and the unified filter operator may be a primary unified filter operator. A data pipeline of the plurality of data pipelines may include a secondary split operator configured to act on data output by the primary split operator. The ETL plan further may include a plurality of secondary data pipelines output by the secondary split operator. The ETL plan may further include a plurality of secondary filter operators. The plurality of secondary data pipelines may have at least one secondary filter operator on each secondary data pipeline of the plurality of secondary data pipelines. Generating the primary unified filter operator may include generating a secondary unified filter operator using the plurality of secondary filter operators, and generating the primary unified filter operator using the secondary unified filter operator and the plurality of primary filter operators. The unified filter operator may be or include a first condition of a first filter operator of the plurality of filter operators joined by unifier logic with a second condition of a second filter operator of the plurality of filter operators, wherein the unifier logic may be or include an OR operator. The unified filter operator may implement a portion of a filter operation of a filter operator of the plurality of filter operators and the ETL plan may include a residual filter operator acting on data output by the split operator in the ETL plan, the residual filter operator and the unified filter operator together effecting the filter operation. The ETL plan may further include a transform operator between the split operator and a filter operator of the plurality of filter operators, the method further including excluding the filter operator from the unified filter operator. The method may also include presenting, by the computer system, the updated ETL plan via a user interface.

In certain embodiments, a computer system includes one or more processors and a memory in communication with the one or more processors, the memory configured to store computer-executable instructions, wherein executing the computer-executable instructions causes the one or more processors to perform one or more of the steps of the method or its variations, described above.

In certain embodiments, a computer-readable storage medium stores computer-executable instructions that, when executed, cause one or more processors of a computer system to perform one or more steps of the method or its variations, described above.

Some embodiments include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the claimed subject matter. Thus, it should be understood that although the present claimed subject matter has been specifically disclosed by embodiments and optional features, modification and variation of the concepts herein disclosed may be resorted to by those skilled in the art, and that such modifications and variations are considered to be within the scope of this disclosure as defined by the appended claims.

Figure 1:
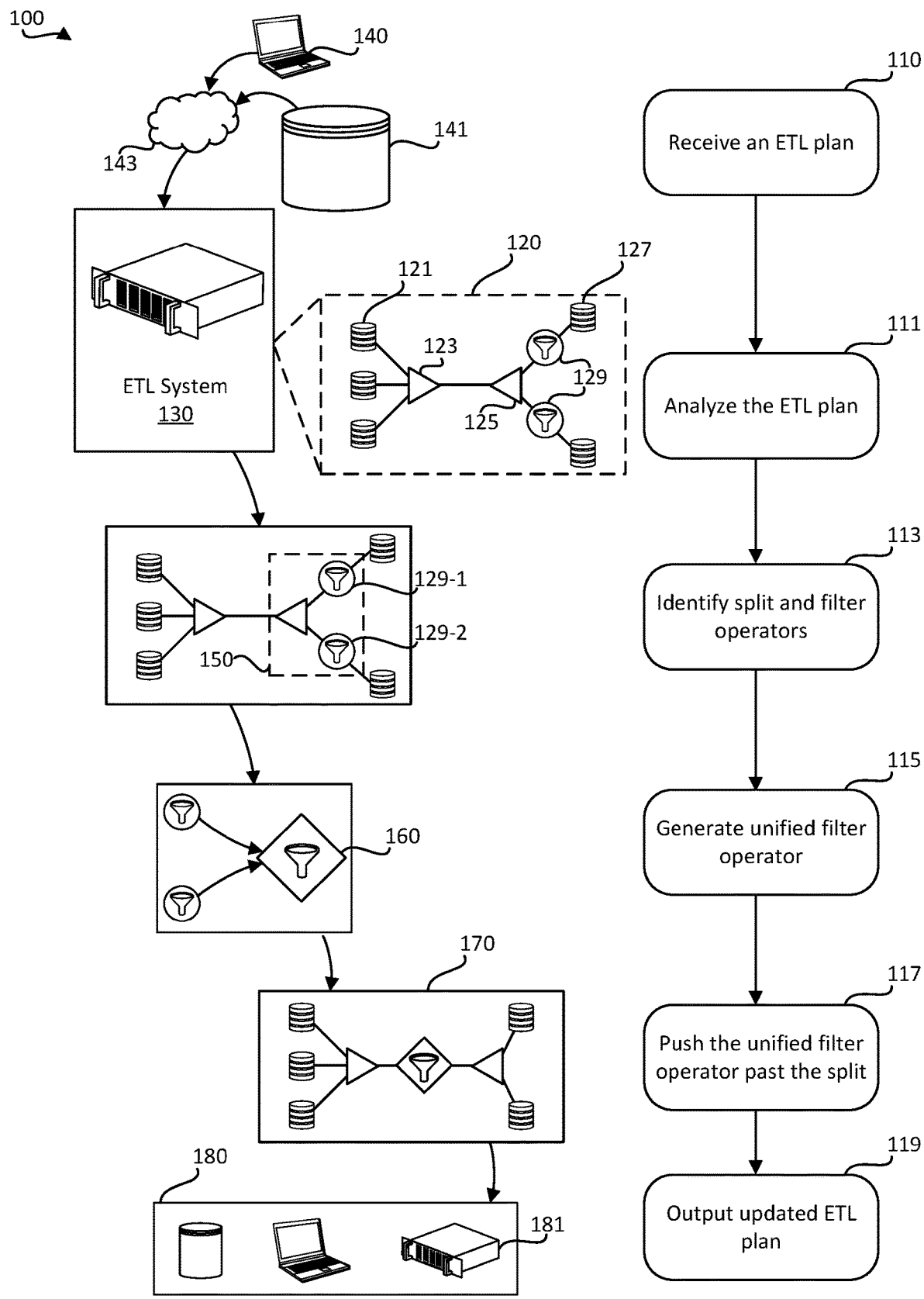
FIG. 1 illustrates an example workflow for updating an ETL plan, according to at least one embodiment.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiments only, and is not intended to limit the scope, applicability or configuration of the disclosure. Rather, the ensuing description of the preferred exemplary embodiments will provide those skilled in the art with an enabling description for implementing various embodiments. It is understood that various changes may be made in the function and arrangement of elements without departing from the spirit and scope as set forth in the appended claims.

Specific details are given in the following description to provide a thorough understanding of the embodiments. However, it will be understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart or diagram may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

Cloud-based platforms provide scalable and flexible computing resources for users. Such cloud-based platforms, also referred to as infrastructure as a service (IaaS) may offer entire suites of cloud solutions around a customer's data, such as solutions for authoring transformations, loading data, and presenting the data. Extract, transform, load (ETL) is the general procedure of copying data from one or more data sources into one or more destination systems that represent the data differently from the source(s) or in a different context than the source(s). An exemplary application of ETL operations includes data integration as part of Infrastructure as a Service (IaaS) data management. Data extraction involves extracting data from homogeneous or heterogeneous sources that may integrate data from multiple systems or applications, typically developed and supported by different vendors or hosted on separate computer hardware. Data transformation processes data by various operations effected on the data, such as data cleaning and transforming, to prepare the data for a storage format and/or structure for the destination system(s). Data loading describes the insertion of data into the destination system(s), which may include a database such as an operational data store.

In the data transformation stage, a series of rules or functions are applied to the extracted data to prepare it for loading into the destination system(s). The functions may include joining data from multiple sources (e.g., lookup, merge) and deduplicating the data. The functions may include splitting a column into multiple columns (e.g., converting a comma-separated list, specified as a string in one column, into individual values in different columns). The functions may also include filtering the data, for example, by selecting only certain columns to load, for example, by column attributes.

ETL operations may be organized in an ETL plan, identifying the source(s), transformation(s) and loading operations, connected by data pipelines. In the interest of reducing the computational demands of implementing the ETL plan, operations may be "pushed down" from the network to the source(s). In this context, the network may refer to IaaS infrastructure such as computational resources and database management systems that are tasked with implementing ETL operations in accordance with the ETL plan. In this way, pushing down ETL operations may include revising the ETL plan in one or more ways. For example, operations that may be implemented by the source(s) instead of the network may be shifted to the source(s), which may reduce the resource demand on the network. As another example, techniques may be applied to reduce the resource demand of constituent operations included in the ETL plan. As described herein, the techniques may include, but are not limited to, pushing down one or more transform operations in the ETL plan closer to the source(s). Pushing down filter operations may significantly improve overall ETL performance, at least in that it may reduce the volume of data transformed in the ETL plan, for example, when a filter operation is pushed closer to the source(s).

In some cases, ETL plans include filter operators "downstream" of other transform operators. In the context of ETL plans, "downstream" and "upstream" refer to a relative position between the source(s) and the destination(s), in that a downstream operator will receive data output from an upstream operator. In some cases, an ETL plan may include a split operator that takes in one data pipeline and outputs two or more data pipelines. The output pipelines may be identical, as when the split operator clones the input pipeline. The output pipelines may be different, as when the split operator divides or otherwise does not clone the input pipeline. Transform operators downstream of the split operator in the ETL plan will transform the data in one of the output pipelines. In this way, the output pipelines may contain different data or may be differently filtered, which makes push down operations on such ETL plans difficult. For example, state of the art push down techniques will not push a filter operator past a split operator without direct intervention of a data systems engineer or other user. This, in turn, introduces inefficiencies into the ETL plan that may be left unidentified and unresolved without user involvement.

For at least these reasons, the techniques described herein present one or more advantages over state of the art ETL approaches. For example, autonomously (e.g., without human involvement or interaction) identifying and unifying filter operators in an ETL plan, and pushing the unified filter operator past a split operator of the ETL plan, may reduce the volume of data processed by the split operator and improve overall system performance. In addition, unifying and pushing down the filter operators may also permit the filter operator to be pushed down further to the source(s), which represents a potential for significant improvement in ETL resource demand made on an IaaS network. Such performance improvements benefit the IaaS system and the users of the system alike, by reducing energy consumption and operating costs, and increasing the number of ETL plans that can be implemented on the network at a given system capacity.

In an illustrative example, an ETL plan may be prepared by a user of an ETL system of an IaaS system. The ETL plan may be represented visually in a graphical user interface (GUI) of the ETL system, such that the user may add and remove operators and network components, may reposition components of the ETL plan, and may initiate autonomous push down optimization. In this example, the ETL plan may include multiple sources, a join operator receiving data from the sources, a split operator receiving data from the join operator, and one or more filter operators receiving data output by the split operator. For simplicity of explanation, other transformations between the join operator and the split operator are omitted in this example. The split operator may output data into two data pipelines, to be received by different filter operators and subsequently loaded into different destination systems. Prior to implementation of the ETL plan, the ETL system may analyze the ETL plan to reduce the volume of data input to the split operator. As part of the analysis, the ETL system may identify the split operator and the filter operators. To modify the ETL plan, such that the split operator receives a smaller volume of data, the ETL system may generate a unified filter operator that is then placed upstream of the split operator ("pushed past"). The unified filter operator may reproduce at least a portion of the filter conditions of each individual filter operator, so that the split operator receives less data and one or more of the filter operators may be removed from the ETL plan.

FIG. 1 illustrates an example workflow 100 for updating an ETL plan 120, according to at least one embodiment. Updating the ETL plan 120 may provide improved overall performance of an ETL system 130 implementing the workflow 100, for example, by reducing the volume of data operated upon by constituent operators of the ETL plan 120. As described herein, the ETL system 130 may autonomously (e.g., without human intervention) implement operations to update the ETL plan 120, including, but not limited to pushing down filter operators of the ETL plan 120 past split operators of the ETL plan 120.

At operation 110 of the workflow 100, the ETL system 130 may receive the ETL plan 120 from various sources. In some embodiments, the sources may include, but are not limited to, a client device 140 (e.g., a laptop, tablet, terminal, etc.) running an IaaS console application including a ETL editor application, by which a user of the client device 140 may configure and load the ETL plan 120 onto the ETL system 130. In some embodiments, the sources may include a data store 141 or other database system that stores ETL plans from multiple users. In this way, the ETL system 130 may update and improve ETL plans without user intervention, for example, by autonomously implementing operations of the workflow 100 on multiple ETL plans as part of execution operations. As illustrated, the ETL system 130 may communicate with the sources through a network 143. The network 143 may be a public network, as when a user of the client device 140 connects to the ETL system 130 through an IaaS console application on a web browser through the internet. The network 143 may be a private network, as when the ETL system 130 is located in the same physical location as the sources and does not communicate with the sources over a public network. Similarly, the network 143 may be a virtual private network.

The ETL plan 120 may describe the various sources, transformations, and destinations in a visual or symbolic expression, as illustrated in FIG. 1, whereby each element (e.g., source, operator, destination, etc.) of the ETL plan 120 is represented by an object connected by lines representative of data communication between the elements. In the context of the ETL plan 120, the lines are also referred to as data pipelines, where operators act on the data in the pipeline at that position of the ETL plan 120. In some embodiments, the ETL plan 120 may describe one or more data sources 121. The data sources 121 may combine data from different source systems. The data sources 121 may use different data organization or data formats. For example, data-source formats may include, but are not limited to relational databases, XML, JSON or flat files, and may also include non-relational database structures such as Information Management System (IMS) or other data structures such as Virtual Storage Access Method (VSAM) or Indexed Sequential Access Method (ISAM). In some cases, data sources 121 may include formats corresponding to external sources from activity such as web crawling or scraping.

The ETL plan 120 may include that data from the one or more data sources 121 may be combined in a join operator 123. The join operator 123 may represent a data transformation that combines the data from the data sources 121 for further transformations of the combined data. The join operator 123 may represent various Boolean operations on the input data from the data sources 121 including, but not limited to, a natural join, an equijoin, a semijoin, or an antijoin. As indicated, the join operator 123 may combine the data from the data sources and may perform transform operations on the data, such that the output data of the join operator 123 may exclude a portion of the data received by the join operator 213. For example, the join operator 123 may deduplicate the output data to remove redundant data.

The ETL plan may include a split operator 125 that operates on the data output from the join operator 123. The ETL plan 120 illustrated in FIG. 1 does not include any additional transform operators between the join operator 123 and the split operator 125, but this is intended merely as a simplification for the purposes of explanation. The ETL plan 120 may include one or more transformations applied to the data between the join operator 123 and the split operator 125 including, but not limited to, operators for selecting, translating, encoding, deriving, sorting, aggregating, transposing or pivoting, or validating the data output from the join operator 123. The split operator 125 of the ETL plan 120 may output data to two destination systems 127. The destination systems 127 may include any type of data store, such as those described in reference to the data sources 121.

In some embodiments, the ETL plan 120 may include one or more filter operators 129. A filter operator 129 may be positioned at any place in the ETL plan 120 where the data may be filtered. For example, the filter operator 129 may be placed so that it receives data from a source 121 and filters it prior to sending it to the join operator 123. In another example, the ETL plan 120 may include one or more filter operators 129 between the join operator 123 and the split operator 125. As illustrated, the ETL plan 120 may include a first filter operator 129-1 between the split operator 125 and a destination system 127. The ETL plan 120 may include multiple filter operators 129, such that a filter condition may be applied to data in any given data pipeline of the ETL plan 120. As an illustrative example, a filter operator may receive input data, apply a filter condition to the data, and send a subset of the data to a subsequent (e.g., downstream) operator. As an exemplary implementation, the filter operator 129 may filter data by placing a "WHERE" clause in an SQL statement or an "IF" statement of the generated PL/SQL code. The filter condition may be based on all supported data types and can contain constants. As opposed to the join operator 123 and the split operator 125, the filter operator 129 may have a single input group and a single output group, which would be impractical for either a join operator 123 or a split operator 125. The filter operator 129 may also produce a filtered subset of the input data based on a boolean filter condition expression.

At operation 111 of the workflow 100, the ETL system 130 may analyze the ETL plan 120. Analyzing the ETL plan 120 may also include identifying and mapping the elements of the ETL plan 120 and how those elements are related. In some embodiments, such information may be provided as meta-information during operation 110. The ETL system 130 may, as such, be provided with relational information describing inputs and outputs of each element, for example, as declarative configurations or imperative configurations, from which it can identify the nature and volume of data operated on by each element of the ETL plan 120.

Analyzing the ETL plan 120 may also include multiple approaches to improving the ETL plan 120. For example, analyzing the ETL plan 120 may include estimating a total data volume represented in the ETL plan (e.g., in terms of a data size, such as TB), estimating a computational resource demand based, for example, on the various operators included in the ETL plan 120, or other approaches to define a quantitative criterion by which modifications to the ETL plan 120 may be estimated to improve the ETL plan 120. For example, pushing one or more filter operators 129 past the split operator 125 may reduce the volume of data input to the split operator 125. Since the split operator may multiply redundancies, reversing the order of the elements in the ETL plan 120 such that data are filtered before being split may represent a significant reduction in the volume of data being transformed in the ETL plan 120 downstream of the join operator 123.

As part of updating the ETL plan 120, operation 113 of the workflow 100 may include identifying, by the ETL system 130, those filter operators 129 that receive data from the split operator 125. As illustrated in FIG. 1, the ETL system 130 may identify a group of elements 150 in the ETL plan 120 that includes the first filter operator 129-1 and a second filter operator 129-2, both receiving data from the split operator 125 on separate data pipelines to different destination systems 127. In some embodiments, the group of elements 150 may include multiple tiers of split operators and filter operators included in an ETL plan, as described in more detail in reference to FIG. 5. Furthermore, the group of elements 150 may exclude those filter operators 129 of the ETL plan 120 that provide data to the split operator 125, so that only filter operators 129 downstream of the split operator 125 may be included in subsequent operations of the workflow 100. As described in more detail in reference to FIGS. 2-5, the first filter operator 129-1 and the second filter operator 129-2 may implement the same filter condition or different filter conditions. For example, the first filter operator 129-1 may select a first subset of the data output by the split operator 125, while the second filter operator 129-2 may select a second subset of the data output by the split operator 125, as when the respective destinations systems 127 are configured to receive different data.

The workflow 100 may include operation 115, whereby the ETL system 130 may generate a unified filter operator 160 from the first filter operator 129-1 and the second filter operator 129-2 identified in the group of elements 150 as part of operation 113. In some cases, operation 115 may include defining the unified filter operator 160 such that it reproduces, in whole or in part, the filter conditions of those filter operators 129 that receive data from the split operator 125. The unified filter operator 160 may, therefore represent a single filter operator that can output data intended for each destination system 127 in a single element, rather than implementing separate filter operators on separate data pipelines for each respective destination system 127. Examples of generating the unified filter operator 160 are described in more detail in reference to FIGS. 2-6, below, and may include, but are not limited to, generating a single filter condition that covers both the first filter operator 129-1 and the second filter operator 129-2, generating a compound filter operator that includes both filter conditions linked by a logical operator, or generating a unified filter condition that covers a portion of the filter operators 129 included in the group of elements 150. In a trivial example, when the first filter operator 129-1 and the second filter operator 129-2 apply the same filter condition to the data in different pipelines, the unified filter operator 160 may simply incorporate the filter condition.

Subsequent to generating the unified filter operator at operation 115, the workflow 100 may include pushing the unified filter operator 160 past the split operator 125, and may thereby generate an updated ETL plan 170. In some embodiments, as when the unified filter operator 160 reproduces the filter conditions of both the first filter operator 129-1 and the second filter operator 129-2, the updated ETL plan 170 may replace the downstream filter operators 129 with the unified filter operator 160, as illustrated in FIG. 1. As described in reference to operation 111, the updated ETL plan 170 may represent a significant improvement over the ETL plan 120, at least because the volume of data output by the split operator 125 may be reduced by being filtered by the unified filter operator 160. To illustrate, in the ETL plan 120, the data output by the join operator 123 is duplicated by the split operator 125 and sent to each filter operator 129 in the group of elements 150. In the updated ETL plan 170, however, the split operator 125 only duplicates the data to be received by either destination system 127, which may represent a significant reduction in data volume downstream of the split operator 125.

The updated ETL plan 170 may be output by the ETL system 130, as part of operation 119, to one or more receiving systems 180. For example, outputting the updated ETL plan 170 may include providing the updated ETL plan 170 to the client device 140, whereupon it may be presented via a GUI, such as an IaaS system console application. Similarly, outputting the updated ETL plan 170 may include storing the updated ETL plan 170 in the data store 141, for example, as part of an autonomous ETL efficiency optimization process applied to ETL plans prior to cycle initiation. In some embodiments, external systems 181 included in an IaaS system may receive the updated ETL plan 170, for example, as part of monitoring, administrating, managing, or executing ETL cycles for the IaaS system. As an illustrative example, an ETL administration application may receive and analyze ETL plans from many IaaS users to estimate network load attributable to ETL processes. In another example the external systems 181 may execute the updated ETL plan 170. In this way, the workflow 100 may include implementing the updated ETL plan 170, and, as such may improve the performance of the external systems 181 by reducing the data volume transferred during ETL processes, and potentially permitting a larger number of ETL plans to be implemented by the external systems 181 for a given IaaS ETL system capacity.

The operations of workflow 100 may reduce the volume of data received by the split operator 125, and, as such, may reduce the overall volume of data handled by the split operator 1251 by a factor equivalent to the multiplicity of the split, where multiplicity describes a ratio of output pipelines to input pipelines. For example, where the split operator 125 is shown as a 2:1 split, in some embodiments, a split operator may include a higher multiplicity equivalent to the number of destination systems that receive data through the split operator. As an example, a split operator may include, but is not limited to, a 3:1 split, a 4:1 split, a 5:1 split, or a higher multiplicity split. For simplicity of explanation, split operators are described as having a single input, but may in some cases incorporate a join operator such that the multiplicity ratio may include second numerals larger than one (e.g., 2:2, 3:2, 4:3, etc.).

Figure 2:
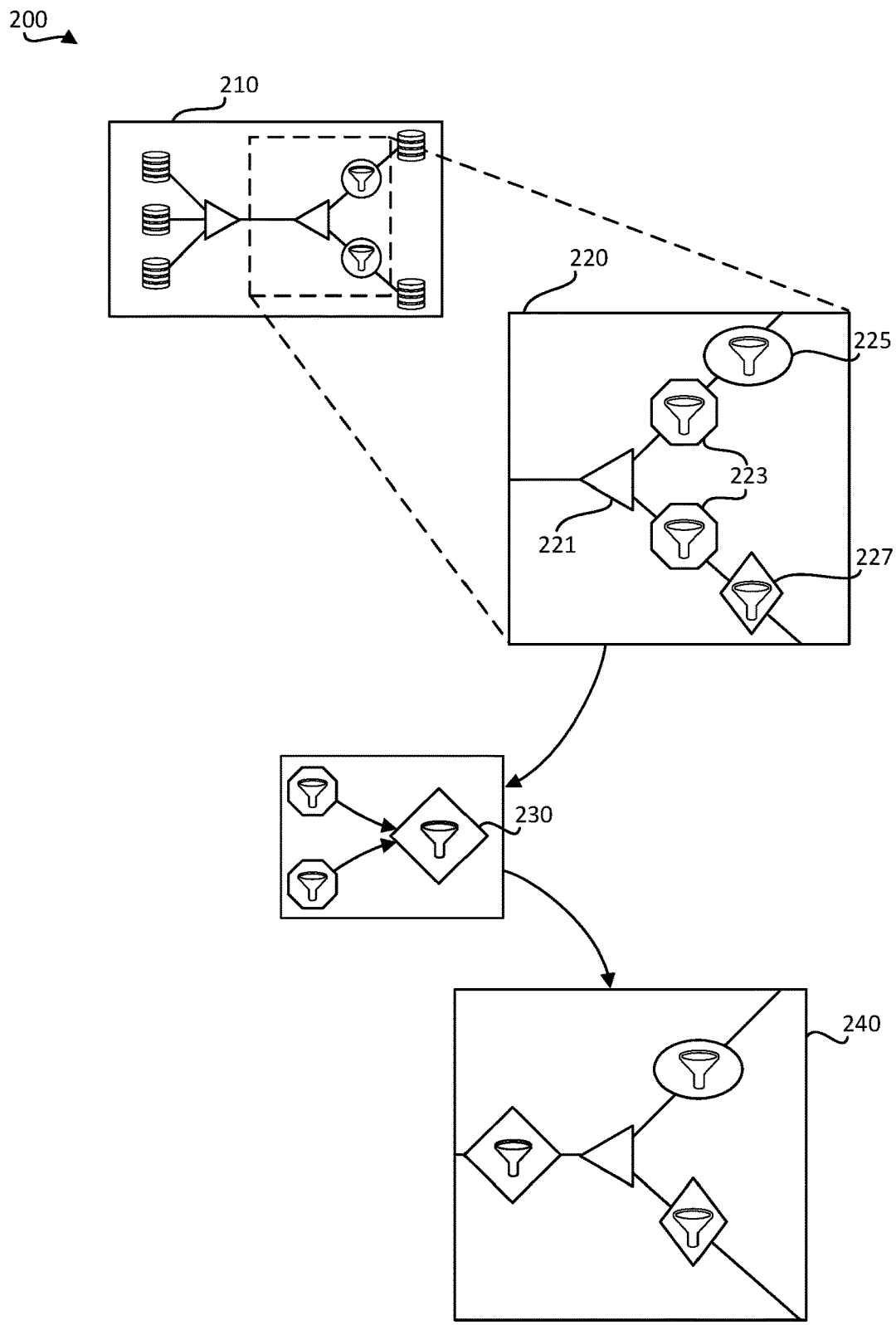
FIG. 2 illustrates an example workflow for generating a unified filter operator in an ETL plan, according to at least one embodiment.

FIG. 2 illustrates an example workflow 200 for generating a unified filter operator in an ETL plan 210, according to at least one embodiment. The workflow 200 may be implemented in the ETL system 130 of FIG. 1 and may include operations that are not explicitly illustrated in FIG. 2. For example, the workflow 200 may include operations for receiving the ETL plan 210, generating an updated the ETL plan, or outputting the updated ETL plan. Such operations are not illustrated in FIG. 2 in the interest of simplicity, to better illustrate aspects of operations 111-117 as applied to the ETL plan 210.

In some embodiments, the ETL plan 210 may include a group of elements 220 including a split operator 221 and filter operators, where the filter operators may include a common filter operator 223. The common filter operator 223 may represent an explicit filter operator included in the ETL plan 210, or may represent a shared aspect of the filter conditions of the filter operators that receive data from the split operator 221. For example, destination systems included in the ETL plan 210 may receive different data sets that share a common subset, such that a common filter condition may be described that would select for the common subset. The common filter condition could, therefore, be represented as the common filter operator 223 in the ETL plan 210, despite not being explicitly included in the ETL plan 210 (e.g., by a user of the client device 140 of FIG. 1 when configuring the ETL plan 120 of FIG. 1). As illustrated, the filter operators that receive data from the split operator 221 may differ in that one or more residual filter operators may remain after the common filter operator 223 is defined. For example, a first residual filter operator 225 and a second residual filter operator 227 may remain, describing different filter conditions. In this way, a filter operator that is downstream of a split operator can be modified, rather than replaced, to avoid redundant filtering operations, as in cases where a unified filter operator may perform only a portion of the respective filtering condition.

The workflow 200 may include generating a unified filter operator 230 that expresses the filter condition of the common filter operator 223. In this example, the filter condition may be or include the common filter condition of the common filter operator 223, which may permit the system implementing the workflow 200 to push the unified filter operator 230 past the split operator 221 by simply replacing both common filter operators 223 with the unified filter operator 230. The resulting updated ETL plan 240 may therefore include the first residual filter operator 225 and the second residual filter operator 227 downstream of the split operator 221 and the split operator 221, in turn, downstream of the unified filter operator 230.

Unifying the residual filter operators presents a different challenge, however, because it may be that no single common filter condition will describe the filter conditions of both the first residual filter operator 225 and the second residual filter operator 227. To that end, the system implementing the workflow 200 (e.g., the ETL system 130 of FIG. 1) may implement additional operations to further reduce the volume of data received by the split operator 221, as described in reference to FIG. 3, below.

Figure 3:
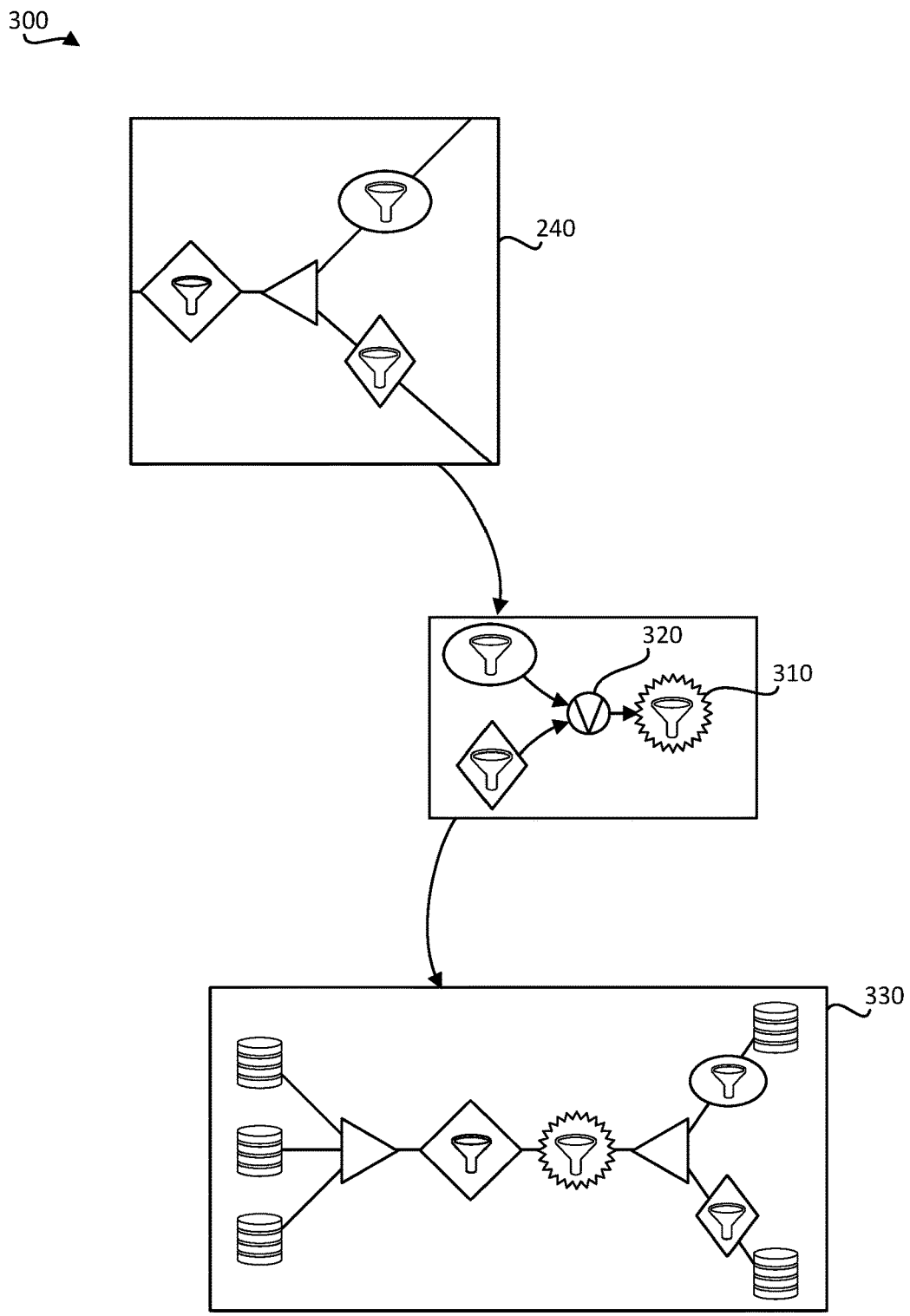
FIG. 3 illustrates an example workflow for generating a unified filter operator with unifier logic, according to at least one embodiment.

FIG. 3 illustrates an example workflow 300 for generating a unified filter operator 310 with unifier logic 320, according to at least one embodiment. As described in reference to FIG. 2, a unified filter operator may include a common filter condition for two filter operators downstream of a split operator. In some cases, however, the filter operators may include non-overlapping filter conditions, such that the common filter condition may be broader than the filter operation effected by the each respective filter operator. Furthermore, in some cases the filter operators may include filter conditions that do not share any commonality between them, such that a unified filter operator may not be generated from common filter conditions.

In some embodiments, multiple filter operators may be unified to generate a unified filter operator 310 using unifier logic 320, such that the unified filter operator 310 selects the data for each respective filter condition, despite a lack of commonality between the filter conditions. As a result, any data that does not meet a filter condition of a filter operator that receives data from a split operator will not be provided to the split operator after the ETL plan is updated. As an illustrative example, a region of the updated ETL plan 240 includes the first residual filter operator 225 and the second residual filter operator 227. The split operator 221 receives data that has been filtered by the unified filter operator 230 and outputs two data pipelines to the first residual filter operator 225 and the second residual filter operator 227, which do not share a common filter condition. As such, the updated ETL plan 240 retains filter operators receiving data from the split operator 221, and, for this reason, operations of the workflow 300 may further improve the updated ETL plan 240 by unifying the first residual filter operator 225 and the second residual filter operator 227.

In the workflow 300, the first residual filter operator 225 and the second residual filter operator 227 may be unified by implementing unifier logic 320 to combine the filter conditions of the respective residual filter operators. Unifier logic 320 may provide the unified filter operator 310 with a compound filter condition that joins the respective filter conditions by a logical relation. The unifier logic 320 may include, but is not limited to, a Boolean "OR" operator, such that the unified filter operator 310 may include the respective filter conditions of the first residual filter operator 225 and the second residual filter operator 227, joined by an OR statement. In this way, the unified filter operator 310 may select data for which either filter condition is true. Pushing the unified filter operator 310 past the split operator 221, therefore, provides an updated ETL plan 330 where the split operator 221 receives only the data that satisfies either the filter condition of the first residual filter operator 225 or the filter condition of the second residual filter operator 227.

In some embodiments, the first residual filter operator 225 and the second residual filter operator 227 may be retained in the updated ETL plan 330, despite pushing the unified filter operator 310 past the split operator 221. Retaining the filter operators may permit the correct data to be provided to the respective destination systems, because the filter conditions may not overlap. Generating the updated ETL plan 330 may improve overall ETL process performance, nevertheless, because the volume of data received by the split operator 221 is still reduced prior to being multiplied. Such a reduction in data volume may free system capacity and may permit additional ETL plans to be executed using IaaS resources.

Other examples of unifier operations may also be applied as part of updating ETL plans and to reduce the volume of data multiplied across split operators. The type of unifier operation implemented by an ETL system (e.g., ETL system 130 of FIG. 1) may depend at least in part on the relationship between the different filter conditions included in filter operators that receive data from the split operator, as described in more detail in reference to FIG. 4, below.

Figure 4:
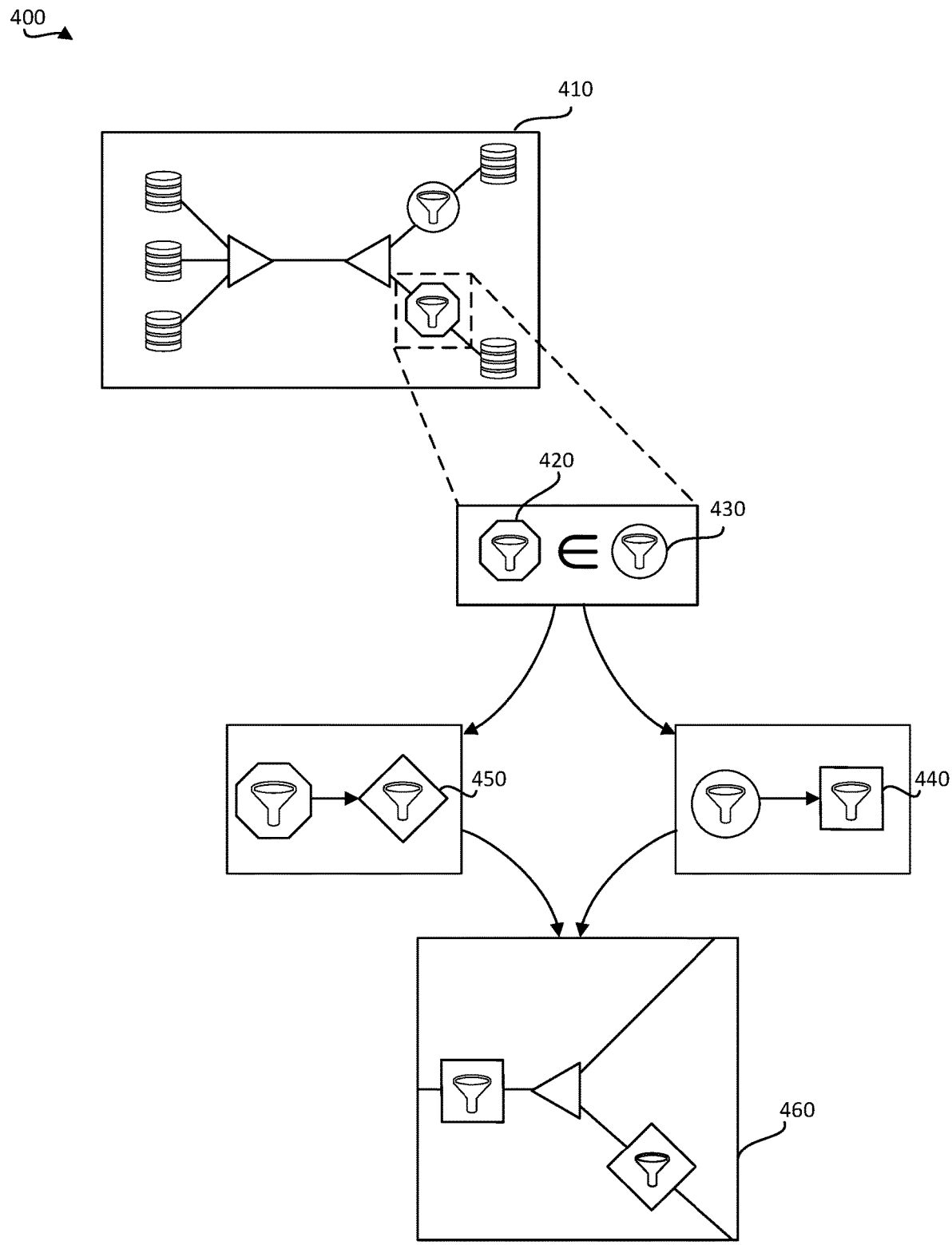
FIG. 4 illustrates an example workflow for unifying overlapping filter operators, according to at least one embodiment.

FIG. 4 illustrates an example workflow 400 for unifying overlapping filter operators, according to at least one embodiment. Where FIGS. 1-3 describe examples of ETL plans where filter operators share a common filter condition or a partial common filter condition, in some embodiments, an ETL plan 410 may include filter operators for which the filter conditions may be differently related. Where the filter conditions are non-overlapping, relational logic may unify the conditions, as with an inclusive OR relation. Where the filter conditions overlap, the extent of overlap may permit at least one of the filter operators to be pushed past the split operator entirely.

As illustrated in FIG. 4, the ETL plan 410 may include a first filter operator 420 and a second filter operator 430. A filter condition of the first filter operator 420 may be such that the dataset selected by the first filter operator 420 is a member of the dataset selected by the second filter operator 430. In this way, a unified filter operator 440 may be generated such that the filter condition of the unified filter operator 440 may be the broader of the two filter conditions, which will therefore contain the data selected by the first filter operator 420 and the second filter operator 430. In the example illustrated in FIG. 4, the first filter operator 420 includes a relatively narrower filter condition, within the set defined by the second filter operator 430. As such, a residual filter operator 450 may be generated and included in an updated ETL plan 460. The residual filter operator 450 may include a filter condition that restricts the dataset selected by the unified filter operator 440 to the dataset selected by the first filter operator 420 of the ETL plan 410.

In some embodiments, implementing the unified filter operator 440 and the residual filter operator 450 in the updated ETL plan 460 may permit the split operator to process a reduced volume of data relative to the split operator of the ETL plan 410. The reduction may be such that the split operator receives the dataset selected by the filter condition of the second filter operator 430 of the ETL plan 410, which may include the dataset selected by the first filter operator 420. In this way, the performance of the ETL plan 410 may be improved by pushing the filter condition of the second filter operator past the split operator, which may improve performance of ETL processes of the overall updated ETL plan 460 that includes the group of elements illustrated in FIG. 4. For example, in some embodiments, the ETL plan 410 may include additional elements downstream of the split operator, such as secondary split operators and secondary data pipelines, which may influence the operations employed to generate unified filter operators, as described below.

Figure 5:
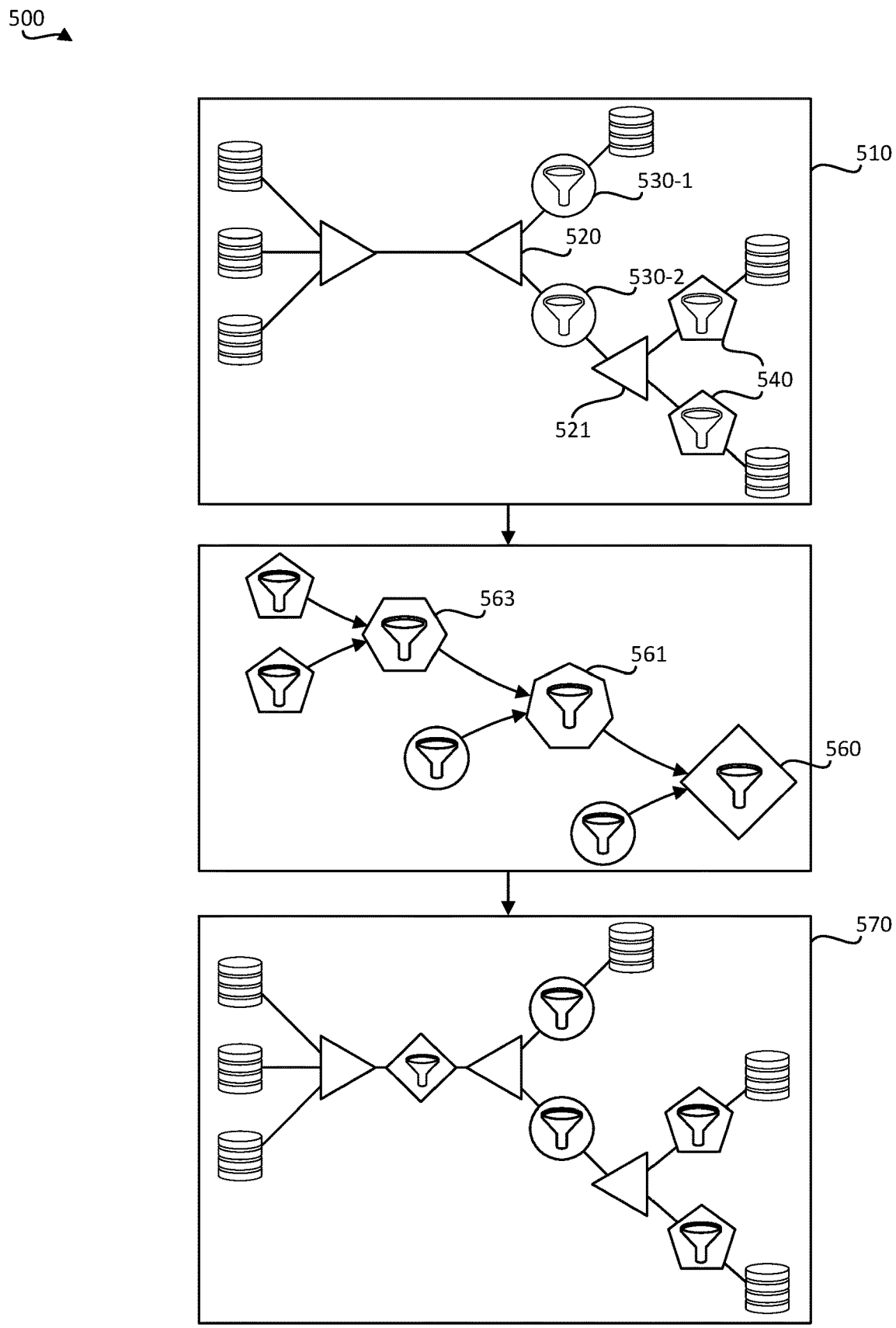
FIG. 5 illustrates an example workflow for recursively unifying tiered filter operators, according to at least one embodiment.

FIG. 5 illustrates an example workflow 500 for recursively unifying tiered filter operators, according to at least one embodiment. In some cases, ETL plans may include relatively complex multi-tiered structures downstream of a split operator. This may result, for example, when multiple destination systems are targeted to receive different subsets of a dataset that is itself the output of a filter operator. Despite the complexity, however, recursive unification operations, as described in the context of the workflow 500, may be implemented to reduce the volume of data provided to a primary split operator and each subsequent split operator of the ETL plans.

As illustrated in FIG. 5, an ETL plan 510 may include a primary split operator 520 receiving data from upstream operators of the ETL plan 510 (e.g., a join operator or other transformations). A secondary split operator 521 may further split one of the primary data pipelines leaving the primary split operator 520, such that the ETL plan 510 may include tiered split operators. In some cases, the data output by the primary split operator 520 may be received by primary filter operators 530. For example, the primary split operator 520 may output data to a first primary filter operator 530-1 on one of the primary data pipelines and to a second primary filter operator 530-2 on a different primary data pipeline. It will be understood that the ETL plan 510 is simplified for clarity of explanation, and that in some embodiments ETL plans may include higher-multiplicity split operators, different filter operator configurations, multiple secondary split operators on multiple primary data pipelines, or higher-order split operators (e.g., tertiary split operators, etc.). In some cases, the second primary filter operator 530-2 may include a different filter condition than that of the first primary filter operator 530-1. As such, a 3:1 primary split operator would produce a different dataset than the arrangement shown in the ETL plan 510.

In some cases, the ETL plan 510 may include secondary filter operators 540, which may also include different filter conditions. Primary filter operators 530 and secondary filter operators 540 may unified recursively, by first unifying higher-order filter operators and then unifying lower order filter operators, such that a primary unified filter operator 560 may be generated for the entire group of elements that includes the primary split operator 520 and downstream elements. For example, a secondary unified filter operator 563 may be generated from the secondary filter operators 540, as described in more detail in reference to the foregoing figures, by combination, relational logic, etc. Subsequently, the second primary filter operator 530-2 may be combined with the secondary unified filter operator 563 by pushing the secondary unified filter operator 563 past the secondary split operator 521. In this way, the data provided to the secondary split operator 521 may be limited to those data that satisfy the filter condition(s) of the secondary filter operators 540. Generating a combined filter operator 561 may permit the further generation of the primary unified filter operator 560 by unifying the filter conditions of the primary filter operators 530 and the secondary filter operators 540, as described in reference to FIGS. 1-4, above.

The workflow 500 may include pushing the primary unified filter operator 560 past the primary split operator 520. An updated ETL plan 570 may therefore include the primary unified filter operator 560 to select a dataset upstream of the primary split operator 520. The updated ETL plan 570, as illustrated in FIG. 5, may include the primary filter operators 530 and the secondary filter operators 540, for example, when the various filter operators include different filter conditions. As described in more detail in reference to FIGS. 1-4, however, combinations of the techniques described herein may permit one or more of the filter operators to be removed from the updated ETL plan 570.

By pushing the primary unified filter operator 560 past the primary split operator 520, the volume of data received by the primary split operator 520 may be significantly reduced. Reducing the volume of data provided to the primary split operator 520 may improve the operational characteristics of the updated ETL plan 570 relative to the ETL plan 510. Furthermore, in the case of tiered split operators, the improvement may be compounded by the multiplicity of each split. This, in turn, may improve the performance of the IaaS systems executing the updated ETL plan 570, which may improve the overall performance and operation of the data integration operations of the IaaS system as a whole. Some ETL plans, however, may include elements that interfere with filter unification, and, as such, embodiments described herein may identify and contravene such unification, as an approach to failure avoidance.

Figure 6:
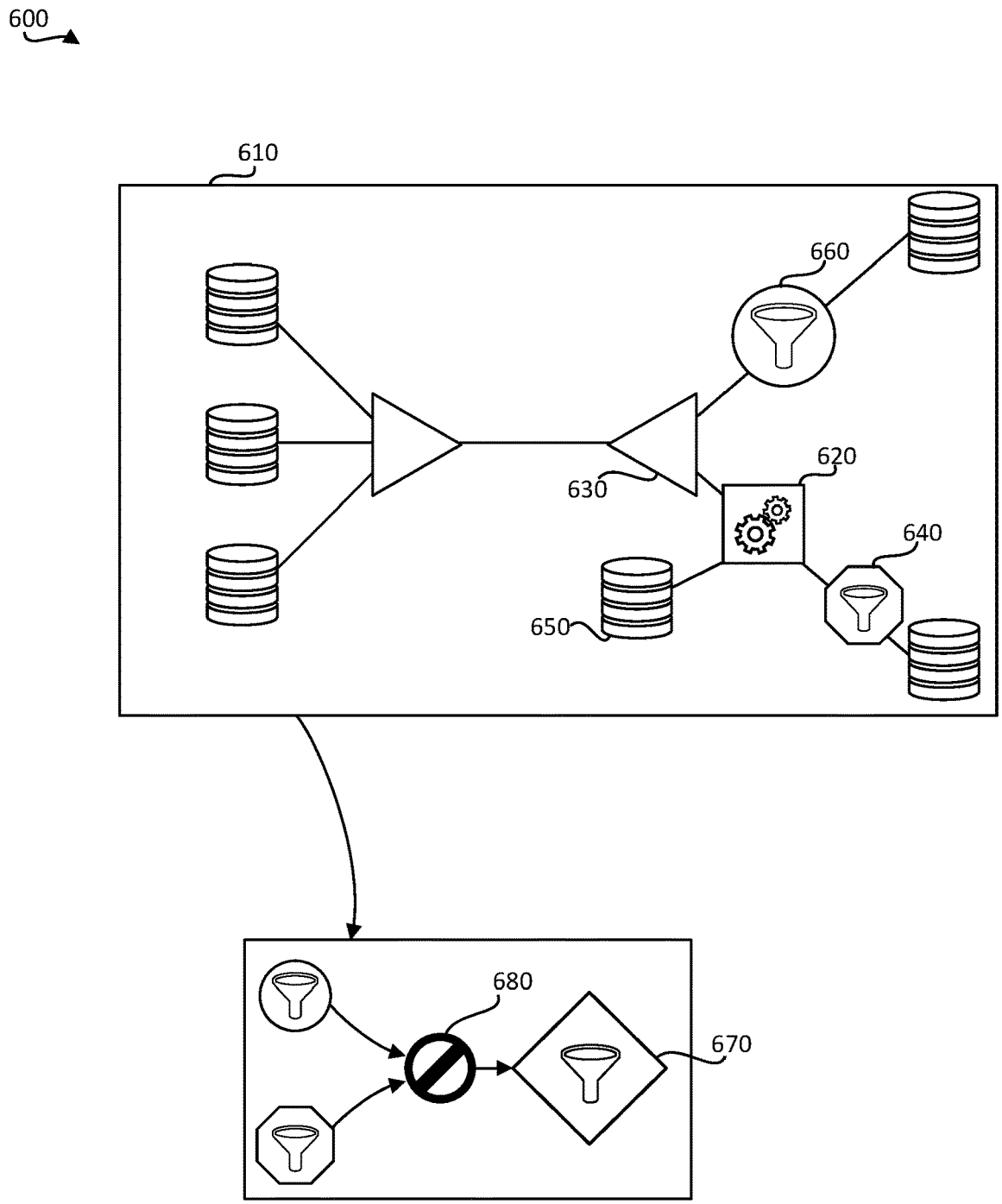
FIG. 6 illustrates an example workflow for contravening an update operation, according to at least one embodiment.

FIG. 6 illustrates an example workflow 600 for contravening an update operation, according to at least one embodiment. In some embodiments, an ETL plan 610 may include transformation operators as part of the ETL plan 610 that may impact the ability of an ETL system (e.g., ETL system 130 of FIG. 1) to unify filter operators as previously described. For example, the ETL plan 610 may include a transform operator 620 between a split operator 630 and a filter operator 640. In some embodiments, the transform operator 620 may be a join operator, configured to combine the data output from the split operator 630 on one data pipeline with data from a data source 650 different from the data source(s) from which the data received by the split operator 630 originated. The transform operator 620 may describe other data transformations, not limited to join operations, such that the filter condition of the filter operator 640 may describe a different data set than that output by the split operator 630.

The filter operator 640, in light of receiving data from the transform operator 620, rather than from the split operator 630, may be incompatible with a second filter operator 660 that receives data directly from the split operator 630. In this way, while a unified filter operator 670 could be expressed that would incorporate the filter condition of the filter operator 640 and a filter condition of the second filter operator 660, the workflow 600 may include an operation 680 whereby the unified filter operator 670 may be contravened when the transform operator 620 is identified in the ETL plan 610. For example, in some cases, the ETL system may analyze the ETL plan 610 (e.g., operation 111 of FIG. 1) and identify that the transform operator 620 is included in the ETL plan 610 between the split operator 630 and the filter operator 640. Once identified, operation 680 may contravene the generation of the unified filter operator 670. In such a case, the filter operator 640 may be limited from being pushed past the split operator 630 due to the inclusion of the transform operator 620.

Contravening the generation of the unified filter operator 670, while not providing reduced data flow across the split operator 630, nonetheless improves the operation of ETL systems by improving robustness of autonomous (e.g., without human interaction) systems for updating and optimizing ETL plans, such as those described herein. With the ability to identify limitations on the generation of unified filter operators, and to further contravene operations to update the ETL plan 610, the ETL system may ensure that the correct data is received by destination system(s), and may reduce or avoid data integration errors that impair IaaS system performance.

Figure 7:
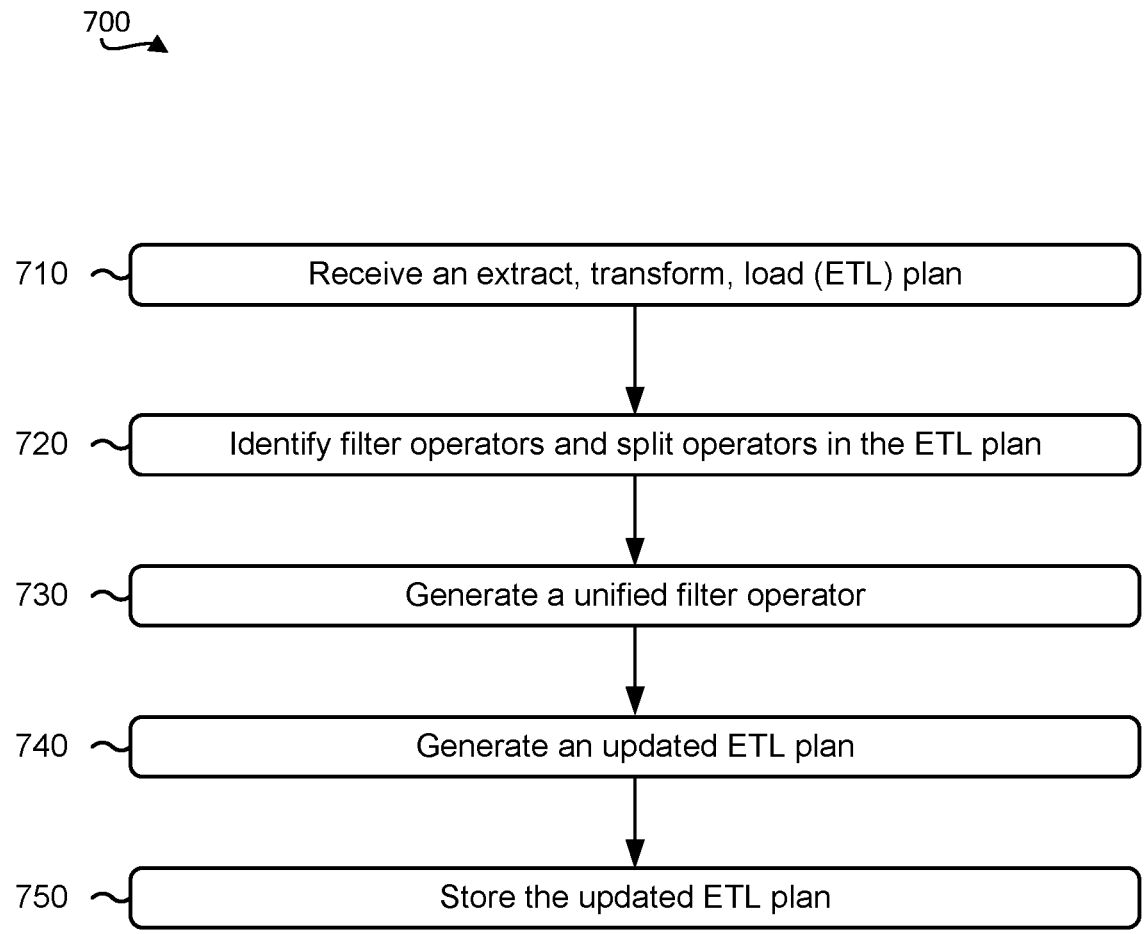
FIG. 7 illustrates an example flow for updating an ETL plan, according to at least one embodiment.

FIG. 7 illustrates an example flow 700 for updating an ETL plan, according to at least one embodiment. The operations of the flow 700 may be implemented as hardware circuitry and/or stored as computer-readable instructions on a non-transitory computer-readable medium of a computer system, such as the ETL system 130 of FIG. 1. As implemented, the instructions represent modules that include circuitry or code executable by a processor(s) of the computer system. The execution of such instructions configures the computer system to perform the specific operations described herein. Each circuitry or code in combination with the processor performs the respective operation(s). While the operations are illustrated in a particular order, it should be understood that no particular order is necessary and that one or more operations may be omitted, skipped, and/or reordered.

In an example, the flow 700 includes operation 710, where the computer system receives an ETL plan (e.g., ETL plan 120 of FIG. 1). The computer system may receive the ETL plan from a user of an IaaS service, for example, through a console application (e.g., client device 140 of FIG. 1). In some cases, the ETL plan may be received as part of autonomous operations of the computer system to reduce data volume of ETL plans by applying the approaches described herein (e.g., data store 141 of FIG. 1). Receiving the ETL plan may be effected through communication over a network (e.g., network 143 of FIG. 1), such as a public network, a private network, a virtual private network, etc.

In an example, the flow 700 includes operation 720, where the computer system identifies filter operators and split operators in the ETL plan. Identifying the filter operators and the split operators may include one or more operations (e.g., operation 113 of FIG. 1). In some cases, identifying the filter operators may follow an optional operation where the computer system may analyze the ETL plan. As described in more detail in reference to FIG. 1, analyzing the ETL plan may include identifying, through relationships between ETL elements for transform operations, source(s), and destination(s). The identification may include analysis of metadata for the ETL elements, such as declarations of relationships between the elements. As such, the operation 720 may include identifying filter operators (e.g., filter operators 129 of FIG. 1) that receive data from a split operator in the ETL plan. As described in more detail in reference to FIG. 6, the operation 720 may include identifying whether the ETL plan includes an intervening transform operator (e.g., transform operator 620 of FIG. 6) between a filter operator and a split operator, such that the computer system may contravene the subsequent operations of the flow 700. As described above, identifying intervening transform operators may improve the robustness of ETL processes, such as executing ETL plans or reducing data integration errors.

In an example, the flow 700 includes operation 730, where the computer system generates a unified filter operator (e.g., unified filter operator 160 of FIG. 1). Generating the unified filter operator may include the techniques described in reference to the FIGS. 1-5. For example, the unified filter operator may incorporate the filter conditions of two or more filter operators joined by relational logic (e.g., logic 320 of FIG. 3). In this example the relational logic may be an OR statement, such that the unified filter operator will select data that satisfies the filter condition of any of the filter operators identified in operation 720. In some cases, as when the filters include a common filter condition, or when one filter outputs a dataset that is a member of the dataset output by another filter condition, the unified filter operator may replace one or more of the filter operators identified in operation 720.

In some embodiments, the ETL plan may include multiple tiers of split operators, as described in more detail in reference to FIG. 5. In such cases, the operation 730 may include recursive generation of multiple unified filter operators (e.g., primary unified filter operator 560, combined filter operator 561, and secondary unified filter operator 563 of FIG. 3). In some cases, the computer system may update an incomplete portion of the ETL plan, for example, by unifying secondary filter operators (e.g., secondary filter operators 540 of FIG. 5) or common filter operators (e.g., common filter operators 223 of FIG. 2), such that a portion of the filter condition may be pushed past a split operator (e.g., split operator 221 of FIG. 2 or secondary split operator 521 of FIG. 5). The ETL plan, thus updated, may retain residual filter operators (e.g., first residual filter operator 225 of FIG. 2) to maintain that the correct datasets are provided to destination system(s).

In an example, the flow 700 includes operation 740, where the computer system generates an updated ETL plan. In operation 740, the computer system may modify the ETL plan by pushing the unified filter operator past the split operator, such that the split operator receives a filtered dataset output by the unified filter operator. As described above, this may reduce the volume of data provided to the split operator. As such, the operation 740 may limit the redundant duplication of data by the split operator, for example, when every filter operator receiving data from the split operator implements at least an overlapping filter condition. In an updated ETL plan, therefore, the unified filter operator may output data to the split operator, which may output data to filter operators that filter a smaller dataset. In this way, the overall resource demand for the updated ETL plan may be reduced relative to the ETL plan. Furthermore, generating an updated ETL plan (e.g., updated ETL plan 170 of FIG. 1) may include generating an updated visualization of the ETL plan, as through the console application of the client device. For example, the updated ETL plan may be presented to a user of the client device through a GUI as part of an ETL editor application. In some embodiments, generating an updated ETL plan may include generating machine-readable declarations of the ETL elements with associated metadata (e.g., identifiers, input/output dependencies, addresses, etc.) that may be referenced by IaaS systems that execute the updated ETL plan.

In an example, the flow 700 includes operation 750, where the computer system stores the updated ETL plan. Storing the updated ETL plan may include outputting the ETL plan to other systems (e.g., receiving systems 180 of FIG. 1), such as data stores, client devices, servers, etc. In some embodiments, the updated ETL plan may be stored in a data store of ETL plans as part of executing the ETL plan. For example, a user of an ETL configuration application may request to execute an ETL plan, in response to which the computer system may implement some or all of the operations of the flow 700, and may transfer the updated ETL plan into an execution queue of an IaaS service that executes ETL operations according the updated ETL plan.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 8:
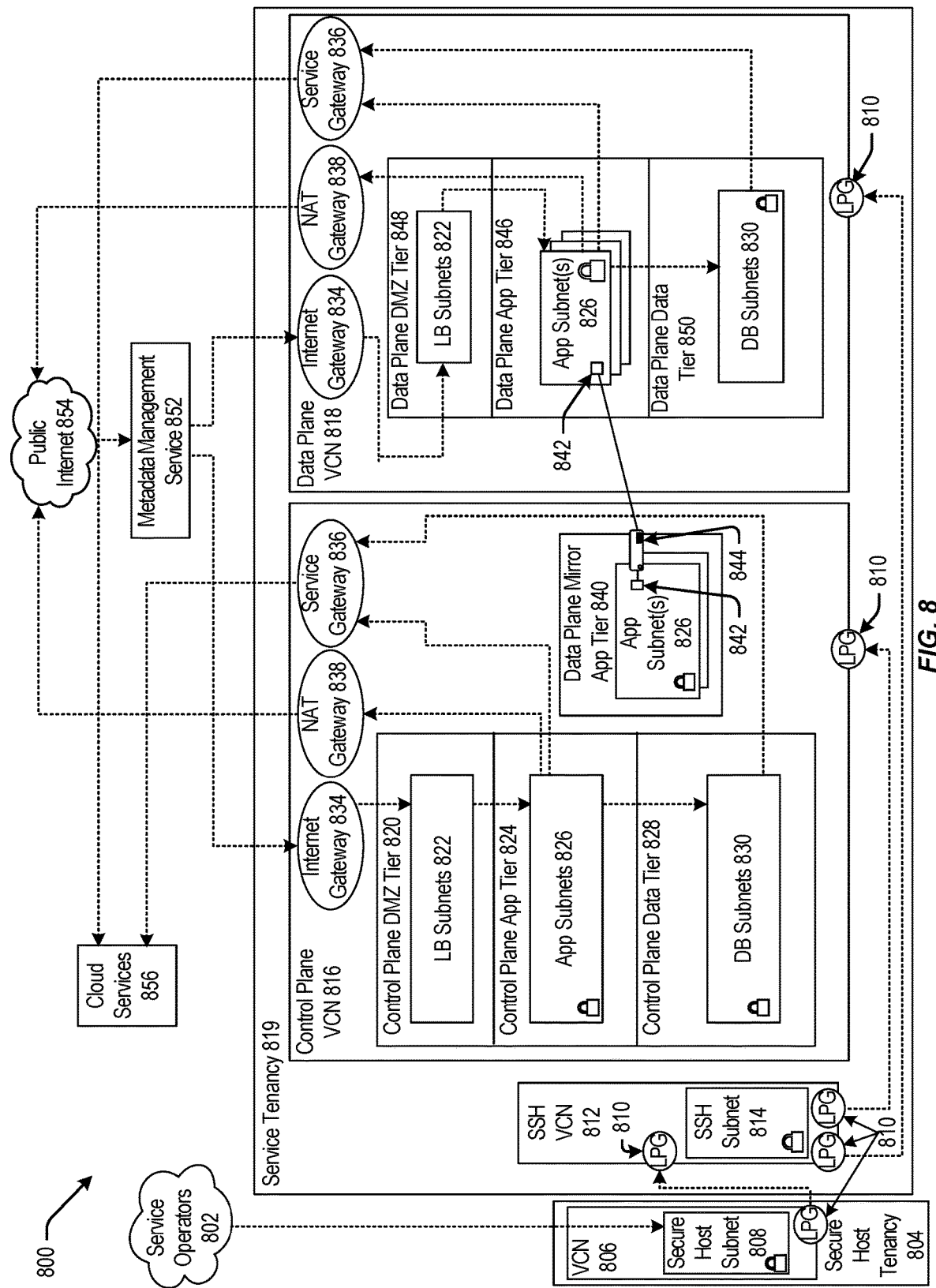
FIG. 8 is a block diagram illustrating one pattern for implementing a cloud infrastructure as a service system, according to at least one embodiment.

FIG. 8 is a block diagram 800 illustrating an example pattern of an IaaS architecture, according to at least one embodiment. Service operators 802 can be communicatively coupled to a secure host tenancy 804 that can include a virtual cloud network (VCN) 806 and a secure host subnet 808. In some examples, the service operators 802 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 806 and/or the Internet.

The VCN 806 can include a local peering gateway (LPG) 810 that can be communicatively coupled to a secure shell (SSH) VCN 812 via an LPG 810 contained in the SSH VCN 812. The SSH VCN 812 can include an SSH subnet 814, and the SSH VCN 812 can be communicatively coupled to a control plane VCN 816 via the LPG 810 contained in the control plane VCN 816. Also, the SSH VCN 812 can be communicatively coupled to a data plane VCN 818 via an LPG 810. The control plane VCN 816 and the data plane VCN 818 can be contained in a service tenancy 819 that can be owned and/or operated by the IaaS provider.

The control plane VCN 816 can include a control plane demilitarized zone (DMZ) tier 820 that acts as a perimeter network (e.g., portions of a corporate network between the corporate intranet and external networks). The DMZ-based servers may have restricted responsibilities and help keep security breaches contained. Additionally, the DMZ tier 820 can include one or more load balancer (LB) subnet(s) 822, a control plane app tier 824 that can include app subnet(s) 826, a control plane data tier 828 that can include database (DB) subnet(s) 830 (e.g., frontend DB subnet(s) and/or backend DB subnet(s)). The LB subnet(s) 822 contained in the control plane DMZ tier 820 can be communicatively coupled to the app subnet(s) 826 contained in the control plane app tier 824 and an Internet gateway 834 that can be contained in the control plane VCN 816, and the app subnet(s) 826 can be communicatively coupled to the DB subnet(s) 830 contained in the control plane data tier 828 and a service gateway 836 and a network address translation (NAT) gateway 838. The control plane VCN 816 can include the service gateway 836 and the NAT gateway 838.

The control plane VCN 816 can include a data plane mirror app tier 840 that can include app subnet(s) 826. The app subnet(s) 826 contained in the data plane mirror app tier 840 can include a virtual network interface controller (VNIC) 842 that can execute a compute instance 844. The compute instance 844 can communicatively couple the app subnet(s) 826 of the data plane mirror app tier 840 to app subnet(s) 826 that can be contained in a data plane app tier 846.

The data plane VCN 818 can include the data plane app tier 846, a data plane DMZ tier 848, and a data plane data tier 850. The data plane DMZ tier 848 can include LB subnet(s) 822 that can be communicatively coupled to the app subnet(s) 826 of the data plane app tier 846 and the Internet gateway 834 of the data plane VCN 818. The app subnet(s) 826 can be communicatively coupled to the service gateway 836 of the data plane VCN 818 and the NAT gateway 838 of the data plane VCN 818. The data plane data tier 850 can also include the DB subnet(s) 830 that can be communicatively coupled to the app subnet(s) 826 of the data plane app tier 846.

The Internet gateway 834 of the control plane VCN 816 and of the data plane VCN 818 can be communicatively coupled to a metadata management service 852 that can be communicatively coupled to public Internet 854. Public Internet 854 can be communicatively coupled to the NAT gateway 838 of the control plane VCN 816 and of the data plane VCN 818. The service gateway 836 of the control plane VCN 816 and of the data plane VCN 818 can be communicatively couple to cloud services 856.

In some examples, the service gateway 836 of the control plane VCN 816 or of the data plane VCN 818 can make application programming interface (API) calls to cloud services 856 without going through public Internet 854. The API calls to cloud services 856 from the service gateway 836 can be one-way: the service gateway 836 can make API calls to cloud services 856, and cloud services 856 can send requested data to the service gateway 836. But, cloud services 856 may not initiate API calls to the service gateway 836.

In some examples, the secure host tenancy 804 can be directly connected to the service tenancy 819, which may be otherwise isolated. The secure host subnet 808 can communicate with the SSH subnet 814 through an LPG 810 that may enable two-way communication over an otherwise isolated system. Connecting the secure host subnet 808 to the SSH subnet 814 may give the secure host subnet 808 access to other entities within the service tenancy 819.

The control plane VCN 816 may allow users of the service tenancy 819 to set up or otherwise provision desired resources. Desired resources provisioned in the control plane VCN 816 may be deployed or otherwise used in the data plane VCN 818. In some examples, the control plane VCN 816 can be isolated from the data plane VCN 818, and the data plane mirror app tier 840 of the control plane VCN 816 can communicate with the data plane app tier 846 of the data plane VCN 818 via VNICs 842 that can be contained in the data plane mirror app tier 840 and the data plane app tier 846.

In some examples, users of the system, or customers, can make requests, for example create, read, update, or delete (CRUD) operations, through public Internet 854 that can communicate the requests to the metadata management service 852. The metadata management service 852 can communicate the request to the control plane VCN 816 through the Internet gateway 834. The request can be received by the LB subnet(s) 822 contained in the control plane DMZ tier 820. The LB subnet(s) 822 may determine that the request is valid, and in response to this determination, the LB subnet(s) 822 can transmit the request to app subnet(s) 826 contained in the control plane app tier 824. If the request is validated and requires a call to public Internet 854, the call to public Internet 854 may be transmitted to the NAT gateway 838 that can make the call to public Internet 854. Memory that may be desired to be stored by the request can be stored in the DB subnet(s) 830.

In some examples, the data plane mirror app tier 840 can facilitate direct communication between the control plane VCN 816 and the data plane VCN 818. For example, changes, updates, or other suitable modifications to configuration may be desired to be applied to the resources contained in the data plane VCN 818. Via a VNIC 842, the control plane VCN 816 can directly communicate with, and can thereby execute the changes, updates, or other suitable modifications to configuration to, resources contained in the data plane VCN 818.

In some embodiments, the control plane VCN 816 and the data plane VCN 818 can be contained in the service tenancy 819. In this case, the user, or the customer, of the system may not own or operate either the control plane VCN 816 or the data plane VCN 818. Instead, the IaaS provider may own or operate the control plane VCN 816 and the data plane VCN 818, both of which may be contained in the service tenancy 819. This embodiment can enable isolation of networks that may prevent users or customers from interacting with other users', or other customers', resources. Also, this embodiment may allow users or customers of the system to store databases privately without needing to rely on public Internet 854, which may not have a desired level of security, for storage.

In other embodiments, the LB subnet(s) 822 contained in the control plane VCN 816 can be configured to receive a signal from the service gateway 836. In this embodiment, the control plane VCN 816 and the data plane VCN 818 may be configured to be called by a customer of the IaaS provider without calling public Internet 854. Customers of the IaaS provider may desire this embodiment since database(s) that the customers use may be controlled by the IaaS provider and may be stored on the service tenancy 819, which may be isolated from public Internet 854.

Figure 9:
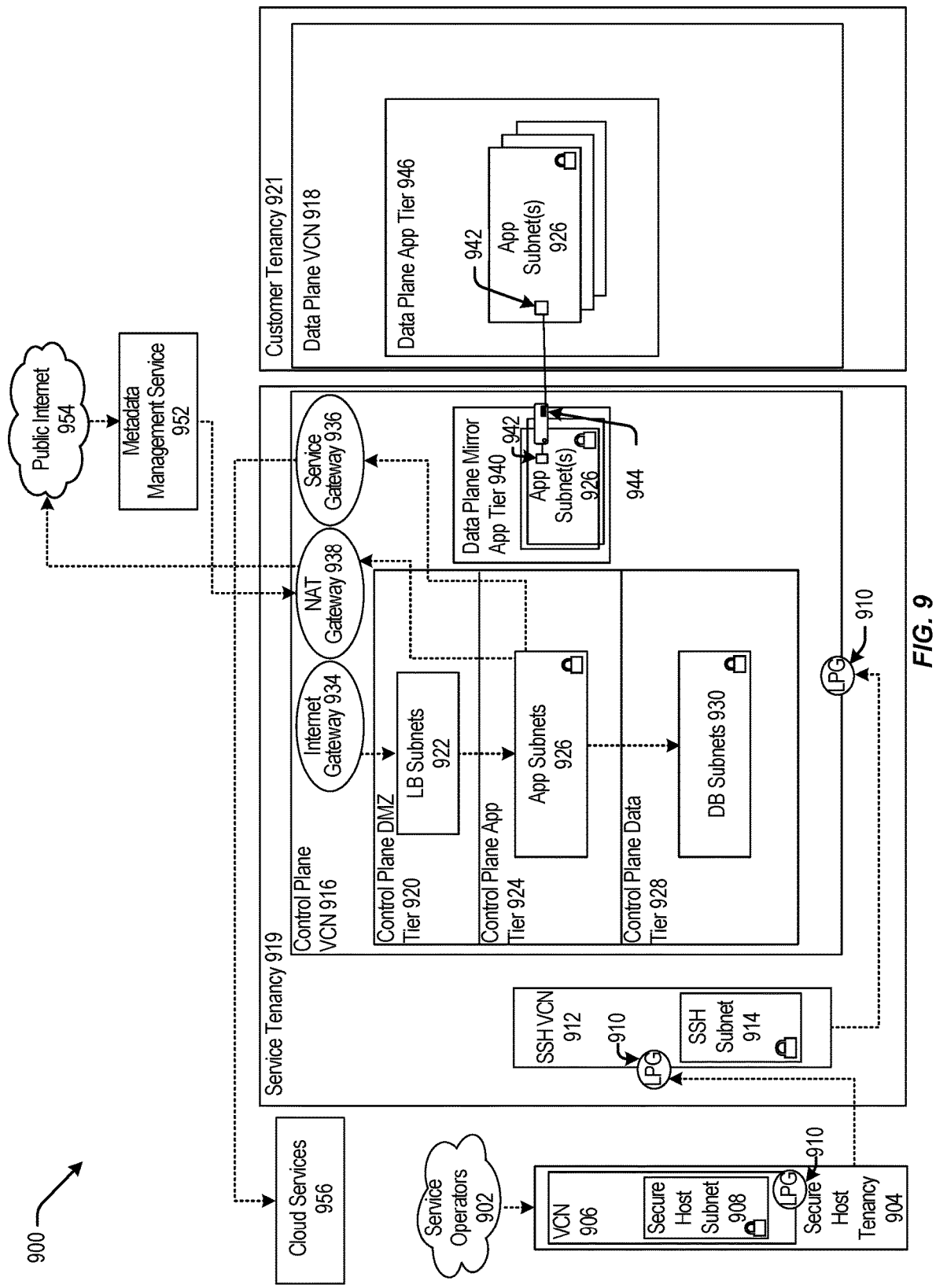
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 802 of FIG. 8) can be communicatively coupled to a secure host tenancy 904 (e.g. the secure host tenancy 804 of FIG. 8) that can include a virtual cloud network (VCN) 906 (e.g. the VCN 806 of FIG. 8) and a secure host subnet 908 (e.g. the secure host subnet 808 of FIG. 8). The VCN 906 can include a local peering gateway (LPG) 910 (e.g. the LPG 810 of FIG. 8) that can be communicatively coupled to a secure shell (SSH) VCN 912 (e.g. the SSH VCN 812 of FIG. 8) via an LPG 810 contained in the SSH VCN 912. The SSH VCN 912 can include an SSH subnet 914 (e.g. the SSH subnet 814 of FIG. 8), and the SSH VCN 912 can be communicatively coupled to a control plane VCN 916 (e.g. the control plane VCN 816 of FIG. 8) via an LPG 910 contained in the control plane VCN 916. The control plane VCN 916 can be contained in a service tenancy 919 (e.g. the service tenancy 819 of FIG. 8), and the data plane VCN 918 (e.g. the data plane VCN 818 of FIG. 8) can be contained in a customer tenancy 921 that may be owned or operated by users, or customers, of the system.

The control plane VCN 916 can include a control plane DMZ tier 920 (e.g. the control plane DMZ tier 820 of FIG.

8) that can include LB subnet(s) 922 (e.g. LB subnet(s) 822 of FIG. 8), a control plane app tier 924 (e.g. the control plane app tier 824 of FIG. 8) that can include app subnet(s) 926 (e.g. app subnet(s) 826 of FIG. 8), a control plane data tier 928 (e.g. the control plane data tier 828 of FIG. 8) that can include database (DB) subnet(s) 930 (e.g. similar to DB subnet(s) 830 of FIG. 8). The LB subnet(s) 922 contained in the control plane DMZ tier 920 can be communicatively coupled to the app subnet(s) 926 contained in the control plane app tier 924 and an Internet gateway 934 (e.g. the Internet gateway 834 of FIG. 8) that can be contained in the control plane VCN 916, and the app subnet(s) 926 can be communicatively coupled to the DB subnet(s) 930 contained in the control plane data tier 928 and a service gateway 936 (e.g. the service gateway of FIG. 8) and a network address translation (NAT) gateway 938 (e.g. the NAT gateway 838 of FIG. 8). The control plane VCN 916 can include the service gateway 936 and the NAT gateway 938.

The control plane VCN 916 can include a data plane mirror app tier 940 (e.g. the data plane mirror app tier 840 of FIG. 8) that can include app subnet(s) 926. The app subnet(s) 926 contained in the data plane mirror app tier 940 can include a virtual network interface controller (VNIC) 942 (e.g. the VNIC of 842) that can execute a compute instance 944 (e.g. similar to the compute instance 844 of FIG. 8). The compute instance 944 can facilitate communication between the app subnet(s) 926 of the data plane mirror app tier 940 and the app subnet(s) 926 that can be contained in a data plane app tier 946 (e.g. the data plane app tier 846 of FIG. 8) via the VNIC 942 contained in the data plane mirror app tier 940 and the VNIC 942 contained in the data plane app tier 946.

The Internet gateway 934 contained in the control plane VCN 916 can be communicatively coupled to a metadata management service 952 (e.g. the metadata management service 852 of FIG. 8) that can be communicatively coupled to public Internet 954 (e.g. public Internet 854 of FIG. 8). Public Internet 954 can be communicatively coupled to the NAT gateway 938 contained in the control plane VCN 916. The service gateway 936 contained in the control plane VCN 916 can be communicatively couple to cloud services 956 (e.g. cloud services 856 of FIG. 8).

In some examples, the data plane VCN 918 can be contained in the customer tenancy 921. In this case, the IaaS provider may provide the control plane VCN 916 for each customer, and the IaaS provider may, for each customer, set up a unique compute instance 944 that is contained in the service tenancy 919. Each compute instance 944 may allow communication between the control plane VCN 916, contained in the service tenancy 919, and the data plane VCN 918 that is contained in the customer tenancy 921. The compute instance 944 may allow resources, that are provisioned in the control plane VCN 916 that is contained in the service tenancy 919, to be deployed or otherwise used in the data plane VCN 918 that is contained in the customer tenancy 921.

In other examples, the customer of the IaaS provider may have databases that live in the customer tenancy 921. In this example, the control plane VCN 916 can include the data plane mirror app tier 940 that can include app subnet(s) 926. The data plane mirror app tier 940 can reside in the data plane VCN 918, but the data plane mirror app tier 940 may not live in the data plane VCN 918. That is, the data plane mirror app tier 940 may have access to the customer tenancy 921, but the data plane mirror app tier 940 may not exist in the data plane VCN 918 or be owned or operated by the customer of the IaaS provider. The data plane mirror app tier 940 may be configured to make calls to the data plane VCN 918 but may not be configured to make calls to any entity contained in the control plane VCN 916. The customer may desire to deploy or otherwise use resources in the data plane VCN 918 that are provisioned in the control plane VCN 916, and the data plane mirror app tier 940 can facilitate the desired deployment, or other usage of resources, of the customer.

In some embodiments, the customer of the IaaS provider can apply filters to the data plane VCN 918. In this embodiment, the customer can determine what the data plane VCN 918 can access, and the customer may restrict access to public Internet 954 from the data plane VCN 918. The IaaS provider may not be able to apply filters or otherwise control access of the data plane VCN 918 to any outside networks or databases. Applying filters and controls by the customer onto the data plane VCN 918, contained in the customer tenancy 921, can help isolate the data plane VCN 918 from other customers and from public Internet 954.

In some embodiments, cloud services 956 can be called by the service gateway 936 to access services that may not exist on public Internet 954, on the control plane VCN 916, or on the data plane VCN 918. The connection between cloud services 956 and the control plane VCN 916 or the data plane VCN 918 may not be live or continuous. Cloud services 956 may exist on a different network owned or operated by the IaaS provider. Cloud services 956 may be configured to receive calls from the service gateway 936 and may be configured to not receive calls from public Internet 954. Some cloud services 956 may be isolated from other cloud services 956, and the control plane VCN 916 may be isolated from cloud services 956 that may not be in the same region as the control plane VCN 916. For example, the control plane VCN 916 may be located in "Region 1," and cloud service "Deployment 8," may be located in Region 1 and in "Region 2." If a call to Deployment 8 is made by the service gateway 936 contained in the control plane VCN 916 located in Region 1, the call may be transmitted to Deployment 8 in Region 1. In this example, the control plane VCN 916, or Deployment 8 in Region 1, may not be communicatively coupled to, or otherwise in communication with, Deployment 8 in Region 2.

Figure 10:
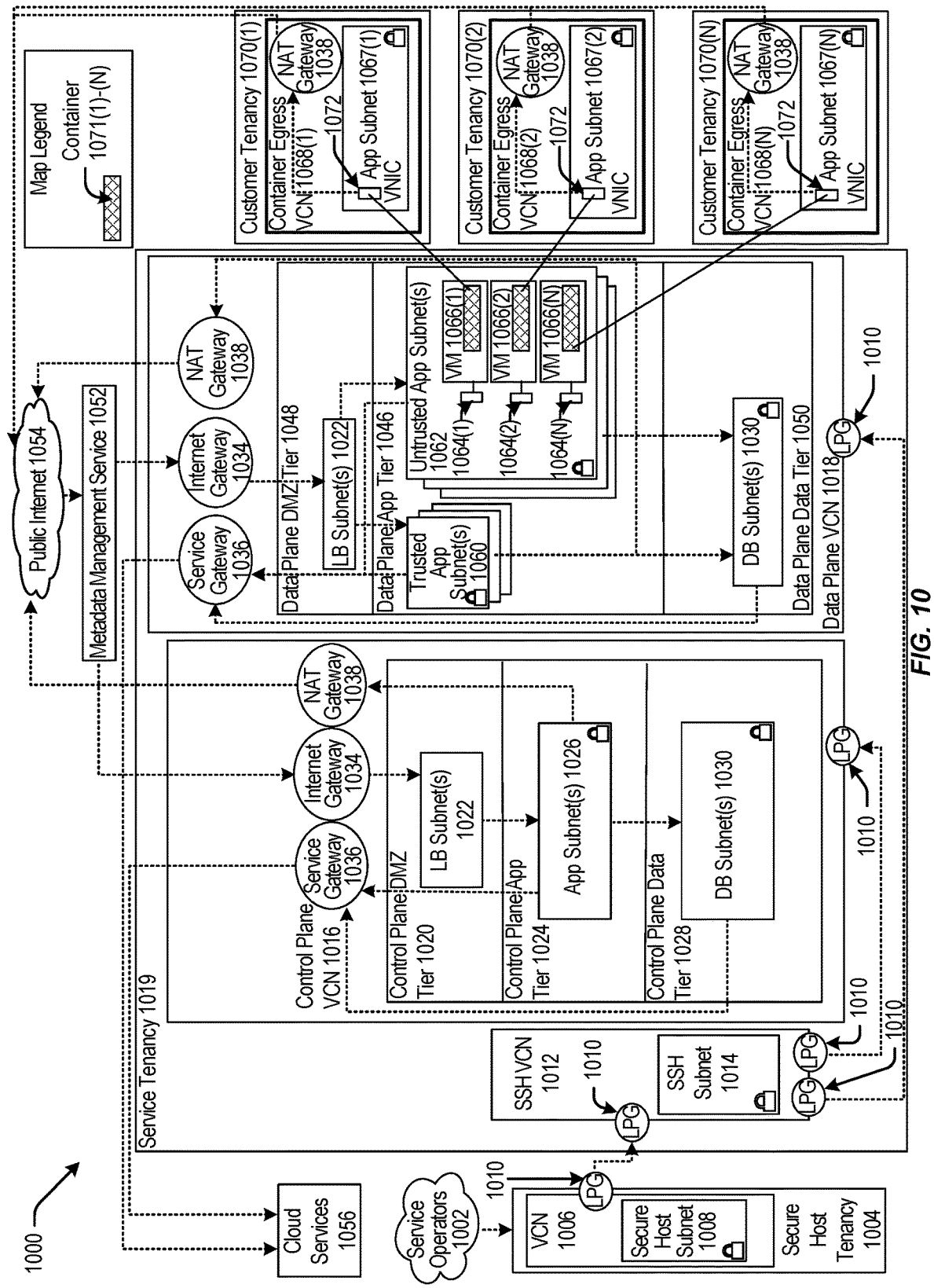
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g. service operators 802 of FIG. 8) can be communicatively coupled to a secure host tenancy 1004 (e.g. the secure host tenancy 804 of FIG. 8) that can include a virtual cloud network (VCN) 1006 (e.g. the VCN 806 of FIG. 8) and a secure host subnet 1008 (e.g. the secure host subnet 808 of FIG. 8). The VCN 1006 can include an LPG 1010 (e.g. the LPG 810 of FIG. 8) that can be communicatively coupled to an SSH VCN 1012 (e.g. the SSH VCN 812 of FIG. 8) via an LPG 1010 contained in the SSH VCN 1012. The SSH VCN 1012 can include an SSH subnet 1014 (e.g. the SSH subnet 814 of FIG. 8), and the SSH VCN 1012 can be communicatively coupled to a control plane VCN 1016 (e.g. the control plane VCN 816 of FIG. 8) via an LPG 1010 contained in the control plane VCN 1016 and to a data plane VCN 1018 (e.g. the data plane 818 of FIG. 8) via an LPG 1010 contained in the data plane VCN 1018. The control plane VCN 1016 and the data plane VCN 1018 can be contained in a service tenancy 1019 (e.g. the service tenancy 819 of FIG. 8).

The control plane VCN 1016 can include a control plane DMZ tier 1020 (e.g. the control plane DMZ tier 820 of FIG. 8) that can include load balancer (LB) subnet(s) 1022 (e.g. LB subnet(s) 822 of FIG. 8), a control plane app tier 1024

(e.g. the control plane app tier 824 of FIG. 8) that can include app subnet(s) 1026 (e.g. similar to app subnet(s) 826 of FIG. 8), a control plane data tier 1028 (e.g. the control plane data tier 828 of FIG. 8) that can include DB subnet(s) 1030. The LB subnet(s) 1022 contained in the control plane DMZ tier 1020 can be communicatively coupled to the app subnet(s) 1026 contained in the control plane app tier 1024 and to an Internet gateway 1034 (e.g. the Internet gateway 834 of FIG. 8) that can be contained in the control plane VCN 1016, and the app subnet(s) 1026 can be communicatively coupled to the DB subnet(s) 1030 contained in the control plane data tier 1028 and to a service gateway 1036 (e.g. the service gateway of FIG. 8) and a network address translation (NAT) gateway 1038 (e.g. the NAT gateway 838 of FIG. 8). The control plane VCN 1016 can include the service gateway 1036 and the NAT gateway 1038.

The data plane VCN 1018 can include a data plane app tier 1046 (e.g. the data plane app tier 846 of FIG. 8), a data plane DMZ tier 1048 (e.g. the data plane DMZ tier 848 of FIG. 8), and a data plane data tier 1050 (e.g. the data plane data tier 850 of FIG. 8). The data plane DMZ tier 1048 can include LB subnet(s) 1022 that can be communicatively coupled to trusted app subnet(s) 1060 and untrusted app subnet(s) 1062 of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include one or more primary VNICs 1064(1)-(N) that can be communicatively coupled to tenant virtual machines (VMs) 1066(1)-(N). Each tenant VM 1066(1)-(N) can be communicatively coupled to a respective app subnet 1067(1)-(N) that can be contained in respective container egress VCNs 1068(1)-(N) that can be contained in respective customer tenancies 1070(1)-(N). Respective secondary VNICs 1072(1)-(N) can facilitate communication between the untrusted app subnet(s) 1062 contained in the data plane VCN 1018 and the app subnet contained in the container egress VCNs 1068(1)-(N). Each container egress VCNs 1068(1)-(N) can include a NAT gateway 1038 that can be communicatively coupled to public Internet 1054 (e.g. public Internet 854 of FIG. 8).

The Internet gateway 1034 contained in the control plane VCN 1016 and contained in the data plane VCN 1018 can be communicatively coupled to a metadata management service 1052 (e.g. the metadata management system 852 of FIG. 8) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some embodiments, the data plane VCN 1018 can be integrated with customer tenancies 1070. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1046. Code to run the function may be executed in the VMs 1066(1)-(N), and the code may not be configured to run anywhere else on the data plane VCN 1018. Each VM 1066(1)-(N) may be connected to one customer tenancy 1070. Respective containers 1071(1)-(N) contained in the VMs 1066(1)-(N) may be configured to run the code. In this case, there can be a dual isolation (e.g., the containers 1071(1)-(N) running code, where the containers 1071(1)-(N) may be contained in at least the VM 1066(1)-(N) that are contained in the untrusted app subnet(s) 1062, which may help prevent incorrect or otherwise undesirable code from damaging the network of the IaaS provider or from damaging a network of a different customer. The containers 1071(1)-(N) may be communicatively coupled to the customer tenancy 1070 and may be configured to transmit or receive data from the customer tenancy 1070. The containers 1071(1)-(N) may not be configured to transmit or receive data from any other entity in the data plane VCN 1018. Upon completion of running the code, the IaaS provider may kill or otherwise dispose of the containers 1071(1)-(N).

In some embodiments, the trusted app subnet(s) 1060 may run code that may be owned or operated by the IaaS provider. In this embodiment, the trusted app subnet(s) 1060 may be communicatively coupled to the DB subnet(s) 1030 and be configured to execute CRUD operations in the DB subnet(s) 1030. The untrusted app subnet(s) 1062 may be communicatively coupled to the DB subnet(s) 1030, but in this embodiment, the untrusted app subnet(s) may be configured to execute read operations in the DB subnet(s) 1030. The containers 1071(1)-(N) that can be contained in the VM 1066(1)-(N) of each customer and that may run code from the customer may not be communicatively coupled with the DB subnet(s) 1030.

In other embodiments, the control plane VCN 1016 and the data plane VCN 1018 may not be directly communicatively coupled. In this embodiment, there may be no direct communication between the control plane VCN 1016 and the data plane VCN 1018. However, communication can occur indirectly through at least one method. An LPG 1010 may be established by the IaaS provider that can facilitate communication between the control plane VCN 1016 and the data plane VCN 1018. In another example, the control plane VCN 1016 or the data plane VCN 1018 can make a call to cloud services 1056 via the service gateway 1036. For example, a call to cloud services 1056 from the control plane VCN 1016 can include a request for a service that can communicate with the data plane VCN 1018.

Figure 11:
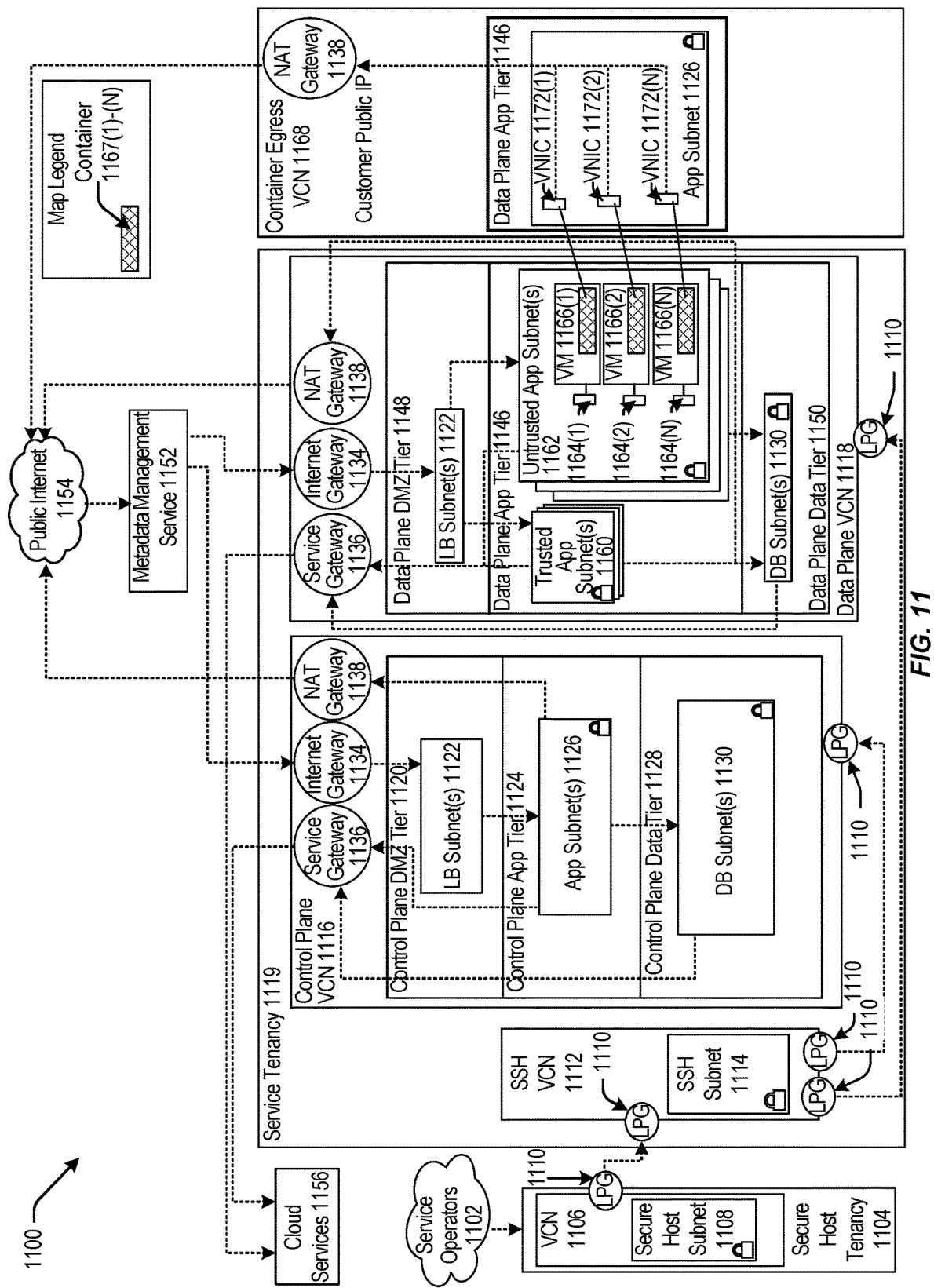
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g. service operators 802 of FIG. 8) can be communicatively coupled to a secure host tenancy 1104 (e.g. the secure host tenancy 804 of FIG. 8) that can include a virtual cloud network (VCN) 1106 (e.g. the VCN 806 of FIG. 8) and a secure host subnet 1108 (e.g. the secure host subnet 808 of FIG. 8). The VCN 1106 can include an LPG 1110 (e.g. the LPG 810 of FIG. 8) that can be communicatively coupled to an SSH VCN 1112 (e.g. the SSH VCN 812 of FIG. 8) via an LPG 1110 contained in the SSH VCN 1112. The SSH VCN 1112 can include an SSH subnet 1114 (e.g. the SSH subnet 814 of FIG. 8), and the SSH VCN 1112 can be communicatively coupled to a control plane VCN 1116 (e.g. the control plane VCN 816 of FIG. 8) via an LPG 1110 contained in the control plane VCN 1116 and to a data plane VCN 1118 (e.g. the data plane 818 of FIG. 8) via an LPG 1110 contained in the data plane VCN 1118. The control plane VCN 1116 and the data plane VCN 1118 can be contained in a service tenancy 1119 (e.g. the service tenancy 819 of FIG. 8).

The control plane VCN 1116 can include a control plane DMZ tier 1120 (e.g. the control plane DMZ tier 820 of FIG. 8) that can include LB subnet(s) 1122 (e.g. LB subnet(s) 822 of FIG. 8), a control plane app tier 1124 (e.g. the control plane app tier 824 of FIG. 8) that can include app subnet(s) 1126 (e.g. app subnet(s) 826 of FIG. 8), a control plane data tier 1128 (e.g. the control plane data tier 828 of FIG. 8) that can include DB subnet(s) 1130 (e.g. DB subnet(s) 1030 of FIG. 10). The LB subnet(s) 1122 contained in the control plane DMZ tier 1120 can be communicatively coupled to the app subnet(s) 1126 contained in the control plane app tier 1124 and to an Internet gateway 1134 (e.g. the Internet gateway 834 of FIG. 8) that can be contained in the control plane VCN 1116, and the app subnet(s) 1126 can be communicatively coupled to the DB subnet(s) 1130 contained in the control plane data tier 1128 and to a service gateway 1136 (e.g. the service gateway of FIG. 8) and a network address translation (NAT) gateway 1138 (e.g. the NAT gateway 838 of FIG. 8). The control plane VCN 1116 can include the service gateway 1136 and the NAT gateway 1138.

The data plane VCN 1118 can include a data plane app tier 1146 (e.g. the data plane app tier 846 of FIG. 8), a data plane DMZ tier 1148 (e.g. the data plane DMZ tier 848 of FIG. 8), and a data plane data tier 1150 (e.g. the data plane data tier 850 of FIG. 8). The data plane DMZ tier 1148 can include LB subnet(s) 1122 that can be communicatively coupled to trusted app subnet(s) 1160 (e.g. trusted app subnet(s) 1060 of FIG. 10) and untrusted app subnet(s) 1162 (e.g. untrusted app subnet(s) 1062 of FIG. 10) of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include primary VNICs 1164(1)-(N) that can be communicatively coupled to tenant virtual machines (VMs) 1166(1)-(N) residing within the untrusted app subnet(s) 1162. Each tenant VM 1166(1)-(N) can run code in a respective container 1167(1)-(N), and be communicatively coupled to an app subnet 1126 that can be contained in a data plane app tier 1146 that can be contained in a container egress VCN 1168. Respective secondary VNICs 1172(1)-(N) can facilitate communication between the untrusted app subnet(s) 1162 contained in the data plane VCN 1118 and the app subnet contained in the container egress VCN 1168. The container egress VCN can include a NAT gateway 1138 that can be communicatively coupled to public Internet 1154 (e.g. public Internet 854 of FIG. 8).

The Internet gateway 1134 contained in the control plane VCN 1116 and contained in the data plane VCN 1118 can be communicatively coupled to a metadata management service 1152 (e.g. the metadata management system 852 of FIG. 8) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some examples, the pattern illustrated by the architecture of block diagram 1100 of FIG. 11 may be considered an exception to the pattern illustrated by the architecture of block diagram 1000 of FIG. 10 and may be desirable for a customer of the IaaS provider if the IaaS provider cannot directly communicate with the customer (e.g., a disconnected region). The respective containers 1167(1)-(N) that are contained in the VMs 1166(1)-(N) for each customer can be accessed in real-time by the customer. The containers 1167(1)-(N) may be configured to make calls to respective secondary VNICs 1172(1)-(N) contained in app subnet(s) 1126 of the data plane app tier 1146 that can be contained in the container egress VCN 1168. The secondary VNICs 1172(1)-(N) can transmit the calls to the NAT gateway 1138 that may transmit the calls to public Internet 1154. In this example, the containers 1167(1)-(N) that can be accessed in real-time by the customer can be isolated from the control plane VCN 1116 and can be isolated from other entities contained in the data plane VCN 1118. The containers 1167(1)-(N) may also be isolated from resources from other customers.

In other examples, the customer can use the containers 1167(1)-(N) to call cloud services 1156. In this example, the customer may run code in the containers 1167(1)-(N) that requests a service from cloud services 1156. The containers 1167(1)-(N) can transmit this request to the secondary VNICs 1172(1)-(N) that can transmit the request to the NAT gateway that can transmit the request to public Internet 1154. Public Internet 1154 can transmit the request to LB subnet(s) 1122 contained in the control plane VCN 1116 via the Internet gateway 1134. In response to determining the request is valid, the LB subnet(s) can transmit the request to app subnet(s) 1126 that can transmit the request to cloud services 1156 via the service gateway 1136.

It should be appreciated that IaaS architectures 800, 900, 1000, 1100 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 12:
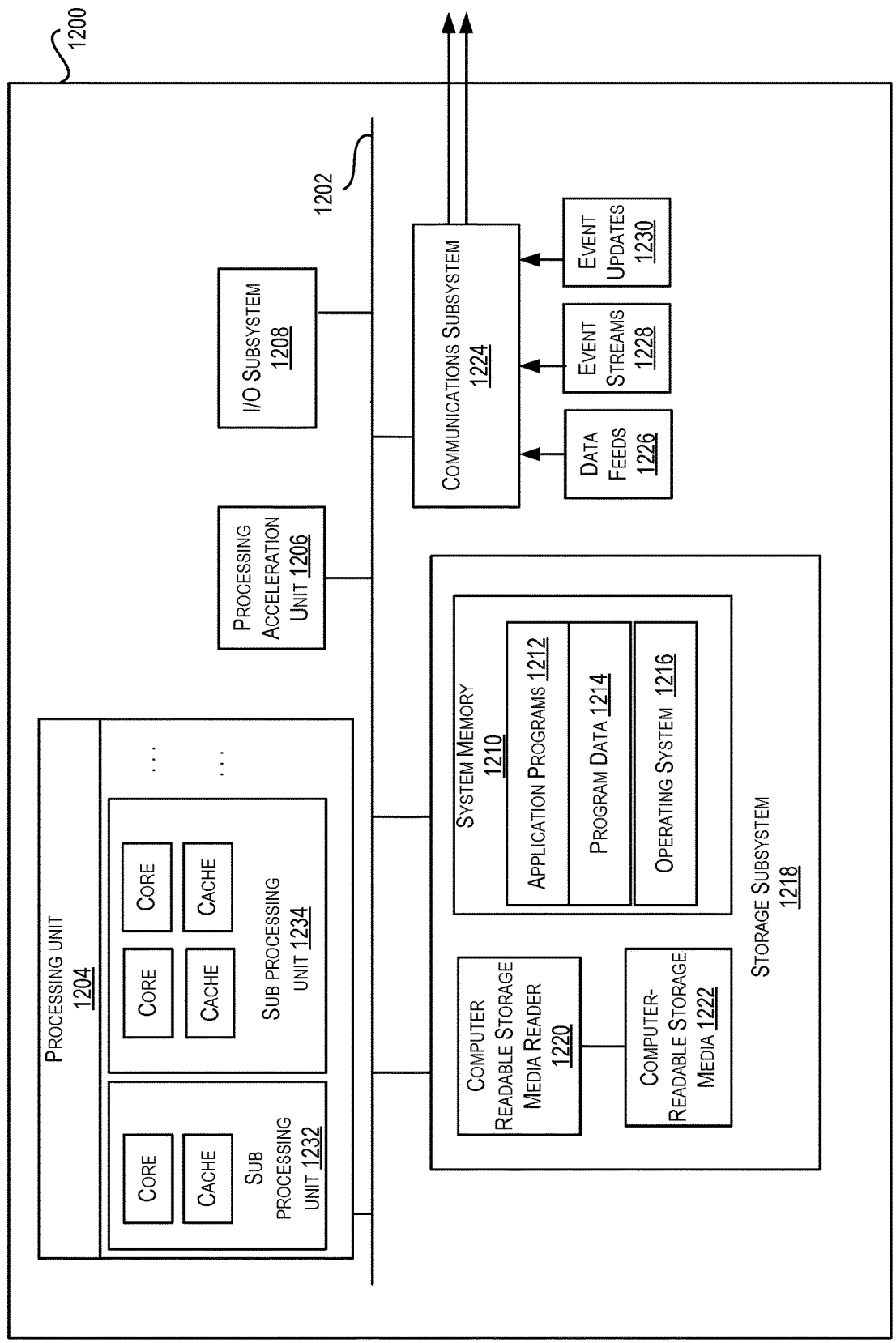
FIG. 12 is a block diagram illustrating an example computer system, according to at least one embodiment.

FIG. 12 illustrates an example computer system 1200, in which various embodiments may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that comprises software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 12 OS, and Palm® OS operating systems.

Storage subsystem 1218 may also provide a tangible computer-readable storage medium for storing the basic programming and data constructs that provide the functionality of some embodiments. Software (programs, code modules, instructions) that when executed by a processor provide the functionality described above may be stored in storage subsystem 1218. These software modules or instructions may be executed by processing unit 1204. Storage subsystem 1218 may also provide a repository for storing data used in accordance with the present disclosure.

Storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1200.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
   receiving, by a computer system, an extract, transform, load (ETL) plan comprising a primary split operator and a plurality of primary filter operators, wherein a data pipeline of a plurality of primary data pipelines comprises a secondary split operator of a plurality of secondary data pipelines configured to act on data output by the primary split operator, and wherein the ETL plan further comprises the plurality of secondary data pipelines output by the secondary split operator;
   in response to the receiving the ETL plan:
      identifying, by the computer system, that the plurality of primary filter operators that are configured to act on the data output by the primary split operator in the extract, transform, load plan;
      automatically generating, by the computer system, a primary unified filter operator using the plurality of primary filter operators;
      generating, by the computer system based on the received ETL plan and the data pipeline, an updated extract, transform, load plan comprising the primary unified filter operator providing filtered data to the primary split operator;
      providing, by the computer system, the updated ETL plan to a client device via a network; and
      storing the updated extract, transform, load plan in a data store of the client device.

2. The method of claim 1, wherein the extract, transform, load plan further comprises a plurality of data pipelines following the primary split operator, the plurality of data pipelines having at least one filter operator of the plurality of primary filter operators on each data pipeline.

3. The method of claim 2, wherein:
   the extract, transform, load plan further comprises a plurality of secondary filter operators, the plurality of secondary data pipelines having at least one secondary filter operator on each secondary data pipeline of the plurality of secondary data pipelines.

4. The method of claim 2, wherein:
   generating the primary unified filter operator comprises:
      generating a secondary unified filter operator using the plurality of secondary filter operators; and
      generating the primary unified filter operator using the secondary unified filter operator and the plurality of primary filter operators.

5. The method of claim 1, wherein the primary unified filter operator comprises a first condition of a first filter operator of the plurality of primary filter operators joined by unifier logic with a second condition of a second filter operator of the plurality of primary filter operators, wherein the unifier logic comprises an OR operator.

6. The method of claim 1, wherein:
the primary unified filter operator implements a portion of a filter operation of a filter operator of the plurality of primary filter operators; and
the extract, transform, load plan comprises a residual filter operator acting on data output by the primary split operator in the extract, transform, load plan, the residual filter operator and the unified filter operator together effecting the filter operation.

7. The method of claim 1, wherein the extract, transform, load plan further comprises a transform operator between the primary split operator and a filter operator of the plurality of primary filter operators, the method further comprising: excluding the filter operator from the unified filter operator.

8. The method of claim 1, further comprising:
presenting, by the computer system, the updated extract, transform, load plan via a user interface.

9. A computer system, comprising
one or more processors;
a memory in communication with the one or more processors, the memory configured to store computer-executable instructions, wherein executing the computer-executable instructions causes the one or more processors to perform steps comprising:
receiving an extract, transform, load (ETL) plan comprising a primary split operator and a plurality of primary filter operators, wherein a data pipeline of a plurality of primary data pipelines comprises a secondary split operator of a plurality of secondary data pipelines configured to act on data output by the primary split operator, and wherein the ETL plan further comprises the plurality of secondary data pipelines output by the secondary split operator;
in response to the receiving the ETL plan:
identifying the plurality of primary filter operators that are configured to act on the data output by the primary split operator in the extract, transform, load plan;
automatically generating a primary unified filter operator using the plurality of primary filter operators;
generating, based on the received ETL plan and the data pipeline, an updated extract, transform, load plan comprising the primary unified filter operator providing filtered data to the primary split operator;
providing the updated ETL plan to a client device via a network; and
storing the updated extract, transform, load plan in a data store of the client device.

10. The computer system of claim 9, wherein the extract, transform, load plan further comprises a plurality of data pipelines following the primary split operator, the plurality of data pipelines having at least one filter operator of the plurality of primary filter operators on each data pipeline.

11. The computer system of claim 9, wherein the unified filter operator comprises a first condition of a first filter operator of the plurality of primary filter operators joined by unifier logic with a second condition of a second filter operator of the plurality of primary filter operators, wherein the unifier logic comprises an OR operator.

12. The computer system of claim 9, wherein the unified filter operator implements a portion of a filter operation of a filter operator of the plurality of primary filter operators; and the extract, transform, load plan comprises a residual filter operator acting on data output by the primary split operator in the extract, transform, load plan, the residual filter operator and the unified filter operator together effecting the filter operation.

13. The computer system of claim 9, wherein the extract, transform, load plan further comprises a transform operator between the primary split operator and a filter operator of the plurality of primary filter operators, and wherein the computer-executable instructions, when executed, further cause the one or more processors of the computer system to perform steps comprising: excluding the filter operator from the unified filter operator.

14. The computer system of claim 9, wherein the computer-executable instructions, when executed, further cause the one or more processors of the computer system to perform steps comprising:
presenting, by the computer system, the updated extract, transform, load plan via a user interface.

15. A non-transitory computer-readable storage medium, storing computer-executable instructions that, when executed, cause one or more processors of a computer system to perform steps comprising:
receiving, by a computer system, an extract, transform, load (ETL) plan comprising a primary split operator and a plurality of primary filter operators, wherein a data pipeline of a plurality of primary data pipelines comprises a secondary split operator of a plurality of secondary data pipelines configured to act on data output by the primary split operator, and wherein the ETL plan further comprises the plurality of secondary data pipelines output by the secondary split operator;
in response to the receiving the ETL plan:
identifying, by the computer system, the plurality of primary filter operators that are configured to act on the data output by the primary split operator in the extract, transform, load plan;
automatically generating, by the computer system, a primary unified filter operator using the plurality of primary filter operators;
generating, by the computer system based on the received ETL plan and the data pipeline, an updated extract, transform, load plan comprising the primary unified filter operator providing filtered data to the primary split operator;
providing, by the computer system, the updated ETL plan to a client device via a network; and
storing the updated extract, transform, load plan in a data store of the client device.

16. The computer-readable storage medium of claim 15, wherein the extract, transform, load plan further comprises a plurality of data pipelines following the primary split operator, the plurality of data pipelines having at least one filter operator of the plurality of primary filter operators on each data pipeline.

17. The computer-readable storage medium of claim 15, wherein the unified filter operator comprises a first condition of a first filter operator of the plurality of primary filter operators joined by unifier logic with a second condition of a second filter operator of the plurality of primary filter operators, wherein the unifier logic comprises an OR operator.

18. The computer-readable storage medium of claim 15, wherein the unified filter operator implements a portion of a filter operation of a filter operator of the plurality of primary filter operators; and the extract, transform, load plan comprises a residual filter operator acting on data output by the primary split operator in the extract, transform, load plan, the residual filter operator and the unified filter operator together effecting the filter operation.

19. The computer-readable storage medium of claim 15, wherein the extract, transform, load plan further comprises a transform operator between the primary split operator and a filter operator of the plurality of primary filter operators, and wherein the computer-executable instructions, when executed, further cause the one or more processors of the computer system to perform steps comprising: excluding the filter operator from the unified filter operator.

* * * * *

UNITED STATES PATENT AND TRADEMARK OFFICE
CERTIFICATE OF CORRECTION

| | |
|---|---|
| PATENT NO. | : 12,001,447 B2 |
| APPLICATION NO. | : 18/081194 |
| DATED | : June 4, 2024 |
| INVENTOR(S) | : Maduri |

It is certified that error appears in the above-identified patent and that said Letters Patent is hereby corrected as shown below:

On the Title Page

Column 2 under Abstract, Line 5, delete "The may" and insert -- The method may --, therefor.

In the Drawings

On sheet 8 of 12, in FIG. 8, under Reference Numeral 854, Line 2, delete "Intemet" and insert -- Internet --, therefor.

On sheet 9 of 12, in FIG. 9, under Reference Numeral 954, Line 1, delete "Intemet" and insert -- Internet --, therefor.

On sheet 10 of 12, in FIG. 10, under Reference Numeral 1054, Line 1, delete "Intemet" and insert -- Internet --, therefor.

In the Claims

In Column 32, Line 32, in Claim 1, before "the plurality" delete "that".

Signed and Sealed this
First Day of October, 2024

Katherine Kelly Vidal
*Director of the United States Patent and Trademark Office*